(12) United States Patent
Kurokawa

(10) Patent No.: US 8,042,645 B2
(45) Date of Patent: Oct. 25, 2011

(54) ELECTRIC POWER STEERING DEVICE

(75) Inventor: Takanori Kurokawa, Kashiwara (JP)

(73) Assignee: JTEKT Corporation, Osaka (JP)

(*) Notice: Subject to any disclaimer, the term of this patent is extended or adjusted under 35 U.S.C. 154(b) by 303 days.

(21) Appl. No.: 12/447,277

(22) PCT Filed: Oct. 26, 2007

(86) PCT No.: PCT/JP2007/070915
§ 371 (c)(1),
(2), (4) Date: Apr. 27, 2009

(87) PCT Pub. No.: WO2008/050862
PCT Pub. Date: May 2, 2008

(65) Prior Publication Data
US 2010/0051378 A1    Mar. 4, 2010

(30) Foreign Application Priority Data
Oct. 27, 2006   (JP) ................................ 2006-292871

(51) Int. Cl.
B62D 5/04   (2006.01)
(52) U.S. Cl. .......................................... 180/444; 74/425
(58) Field of Classification Search .................. 180/444, 180/443, 446; 74/425, 409, 443
See application file for complete search history.

(56) References Cited

U.S. PATENT DOCUMENTS

| | | | |
|---|---|---|---|
| 3,693,999 A * | 9/1972 | Wood, Jr. .................. | 280/93.511 |
| 5,688,055 A * | 11/1997 | Kondou et al. ............... | 384/449 |
| 6,129,171 A | 10/2000 | Takaoka | |
| 6,557,663 B2 * | 5/2003 | Kurokawa et al. ............. | 180/443 |
| 6,622,814 B2 * | 9/2003 | Kurokawa et al. ............. | 180/444 |
| 7,360,468 B2 * | 4/2008 | Yabe et al. ....................... | 74/446 |
| 7,475,612 B2 * | 1/2009 | Kaneiwa et al. ................ | 74/443 |

(Continued)

FOREIGN PATENT DOCUMENTS
EP    1 524 172 A1    4/2005
(Continued)

OTHER PUBLICATIONS

"Metal hub takes stress off plastic gear", Machine Design, Penton Media, Cleveland, OH, US, vol. 69, No. 15, Aug. 7, 1997, p. 50, XP000827064, ISSN: 0024-9114.

Primary Examiner — Anne Marie Boehler
Assistant Examiner — Tashiana Adams
(74) Attorney, Agent, or Firm — Rabin & Berdo, PC

(57) ABSTRACT

A parallel shaft gear mechanism (19a) for a steering assist of the present electric power steering apparatus (1) includes an idle gear (26) rotatably supported via a rolling bearing (39), on an outer peripheral surface (37d) of an intermediate shaft (37) supported by a rack housing (15). The idle gear (26) is arranged in an annular synthetic resin member (43) fixed on the outer peripheral surface (44a) of an outer ring (44) of the bearing (39). On the outer peripheral surface (44a) of the outer ring (44), a regulating portion (53, 53A, 53B, 53C, 53D, 53E, 53F, 53G, 54, 54A, 54B, 54C, 54D, 54E, 54F, 55, 56, 56A, 56B, 59, 59A, and 59B) for regulating relative rotation between the outer ring (44) and the synthetic resin member (43) is arranged. The synthetic resin member (43) is formed in a manner to cover the regulating portion on the outer peripheral surface (44a) of the outer ring (44), as a result of a molding process using a mold.

12 Claims, 23 Drawing Sheets

U.S. PATENT DOCUMENTS

| | | | |
|---|---|---|---|
| 7,779,959 B2 * | 8/2010 | Imagaki et al. | 180/444 |
| 2002/0097935 A1 | 7/2002 | Beckers et al. | |
| 2002/0148672 A1 | 10/2002 | Tatewaki et al. | |
| 2003/0137072 A1 * | 7/2003 | Kurokawa et al. | 264/103 |
| 2008/0236933 A1 * | 10/2008 | Kurokawa | 180/444 |
| 2009/0050399 A1 * | 2/2009 | Segawa et al. | 180/444 |
| 2009/0283353 A1 * | 11/2009 | Kitahata et al. | 180/443 |

FOREIGN PATENT DOCUMENTS

| | | |
|---|---|---|
| JP | 05-262243 | 10/1993 |
| JP | 6-42526 | 6/1994 |
| JP | 10-278813 | 10/1998 |
| JP | 2002-235738 | 8/2002 |
| JP | 2002-308123 | 10/2002 |
| JP | 2003-042264 | 2/2003 |
| JP | 2005-249036 | 9/2005 |

* cited by examiner

ELECTRIC POWER STEERING DEVICE

TECHNICAL FIELD

The present invention relates to an electric power steering apparatus.

PRIOR ART

Electric power steering apparatuses include an electric power steering apparatus of a so-called rack assist type. This type of electric power steering apparatus includes an electric motor for a steering assist, a reducer, and a ball thread mechanism. The ball thread mechanism includes a ball thread shaft and a nut. The ball thread shaft is connected to a rack bar of a rack pinion-type steering mechanism. Output of the electric motor is transmitted via the reducer and the ball thread mechanism, to the rack bar, and as a result, the rack bar is linearly moved (for example, see Patent Document 1).

In Patent Document 1, the reducer includes three gears, i.e., a drive gear, an intermediate gear, and a driven gear. When the electric motor drives the drive gear, the rotation of the drive gear is transmitted via the intermediate gear to the driven gear, and the driven gear drives a nut of the ball thread mechanism. Rotational-center axial lines of these three gears, a rotation shaft of the electric motor, and the rack bar are placed in parallel to one another.

Patent Document 1: Japanese Published Unexamined Patent Application H05-262243

DISCLOSURE OF THE INVENTION

Problem to be Solved

However, the reducer includes three gears, and thus, the number of components tends to increase, and by extension, the assembly cost tends to increase. Also, abnormal noise resulting from the gears easily occurs.

Therefore, an object of the present invention is to provide an electric power steering apparatus that is capable of suppressing abnormal noise and that is inexpensive.

Means for Solving the Problem

To achieve the above-described object, a mode of the present invention is provided with a parallel shaft gear mechanism for decelerating an output rotation of an electric motor for a steering assist. The parallel shaft gear mechanism includes an idle gear rotatably supported via a rolling bearing, on an outer peripheral surface of a spindle supported by a housing. The idle gear is formed by an annular synthetic resin member fixed on the outer peripheral surface of an outer ring of the rolling bearing. On the outer peripheral surface of the outer ring, a regulating portion for regulating relative rotation between the outer ring and the synthetic resin member is arranged. The synthetic resin member is formed in a manner to cover the regulating portion on the outer peripheral surface of the outer ring, as a result of a molding process using a mold.

In this mode, when the synthetic resin member in which the idle gear is arranged is molded, the molding of the synthetic resin member and the fixing of the idle gear to the outer ring can be achieved collectively. Thus, labor for assembly can be alleviated. As a result, manufacturing cost can be decreased. Further, due to a vibration-prevention effect of the synthetic resin member, the generation of abnormal noise associated with the idle gear can be suppressed.

MODE FOR CARRYING OUT THE INVENTION

Hereinafter, an embodiment of the present invention will be described in detail with reference to the accompanying drawings.

Figure 1:
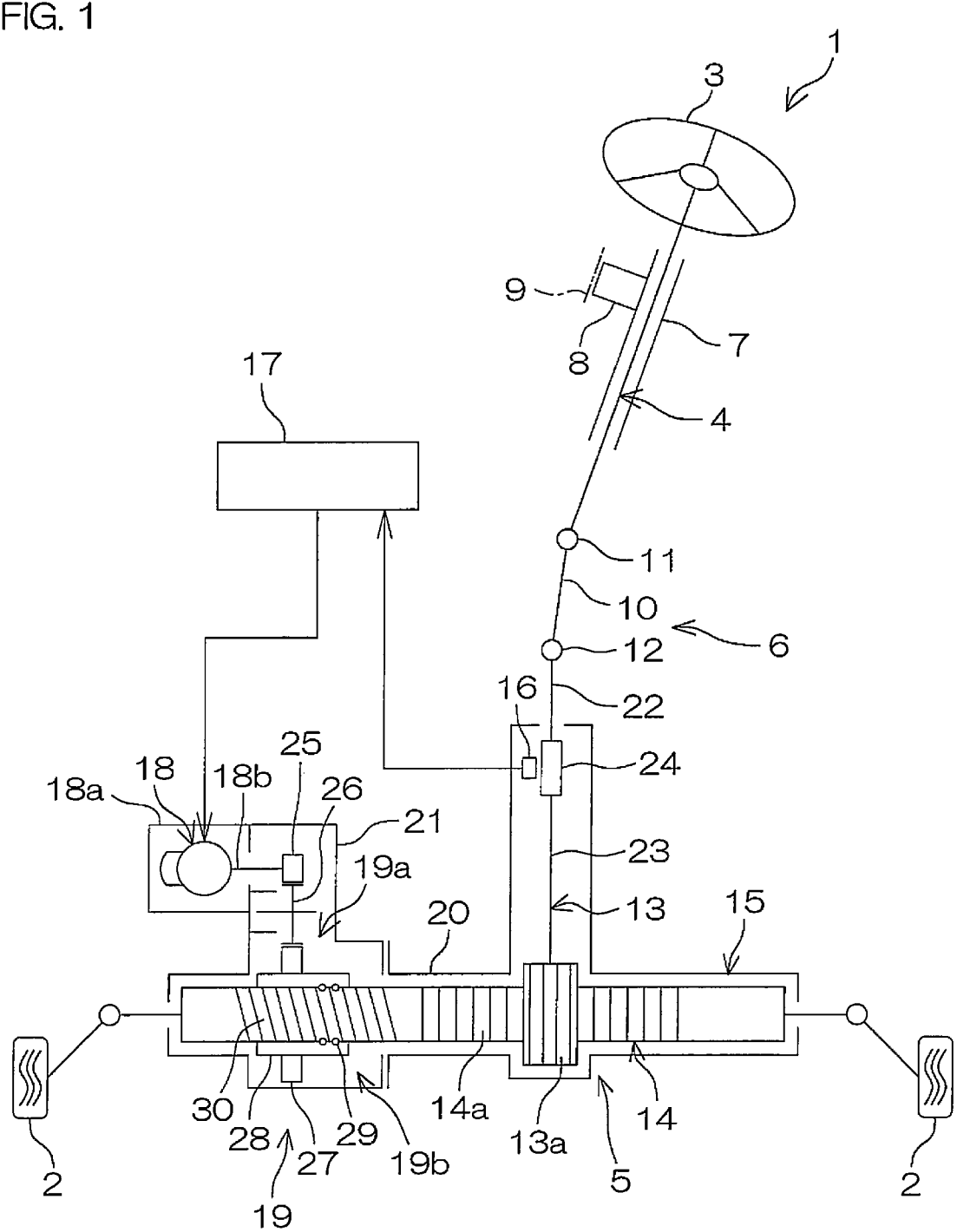
FIG. 1 is a side view of a schematic configuration of an electric power steering apparatus of one embodiment of the present invention.

FIG. 1 is a schematic diagram of an electric power steering apparatus of one embodiment of the present invention. An electric power steering apparatus 1 includes: a steering shaft 4 for transmitting a steering torque applied to a steering wheel 3 as a steering member for steering a steerable wheel 2; a steering mechanism 5, composed of a rack-and-pinion mechanism, for example, for steering the steerable wheel 2 by the steering torque from the steering shaft 4; and an intermediate shaft 6 that is arranged between the steering shaft 4 and the steering mechanism 5 and that serves as a coupling for transmitting rotation therebetween.

The steering shaft 4 inserts through the interior of a steering column 7 and is supported rotatably by the steering column 7. The steering column 7 is supported by a vehicle body 9 via a bracket 8. One end of the steering shaft 4 is connected with the steering wheel 3, and the other end of the steering shaft 4 is connected with the intermediate shaft 6.

The intermediate shaft 6 includes a power transmission shaft 10, a universal joint 11 arranged at one end of the intermediate shaft 6, and a universal joint 12 arranged at the other end of the intermediate shaft 6.

The steering mechanism 5 includes: a pinion shaft 13, being an input shaft; a rack bar 14, being a steered shaft extending in a lateral direction (which is orthogonal to a straight direction) of an automobile; and a rack housing 15 for supporting the pinion shaft 13 and the rack bar 14. Pinion teeth 13a of the pinion shaft 13 and rack teeth 14a of the rack bar 14 are meshed with one another.

The pinion shaft 13 is supported rotatably by the rack housing 15. Also, the rack bar 14 is supported by the rack housing 15 in a manner to freely reciprocate linearly. The rack housing 15 is fixed to a vehicle body 9. To both sides of the rack housing 15, both ends of the rack bar 14 are protruded. Each of the ends of the rack bar 14 is connected to the corresponding steerable wheel 2 via a tie rod and a knuckle arm, which are not shown.

When the steering wheel 3 is steered, the steering torque is transmitted via the steering shaft 4 and the intermediate shaft 6 to the steering mechanism 5. In the steering mechanism 5, the rotation of the pinion shaft 13 is converted by the pinion teeth 13a and the rack teeth 14a into a linear movement of the rack bar 14 along the lateral direction of the automobile. Thereby, the steerable wheel 2 can be steered.

The electric power steering apparatus 1 is configured to obtain a steering assist force according to the steering torque. That is, the electric power steering apparatus 1 includes: a torque sensor 16 for detecting a steering torque; an ECU (Electronic Control Unit) 17, being a controller; an electric motor 18 for a steering assist; and a reducer 19. In the present embodiment, the electric motor 18 and the reducer 19 are arranged in association with the steering mechanism 5.

The rack housing 15 of the steering mechanism 5 includes a first housing 20 and a second housing 21, and is attached to the vehicle body 9. The first housing 20 surrounds one portion of the rack bar 14, supports the pinion shaft 13, and accommodates and supports the torque sensor 16. The second housing 21 is installed consecutively to the first housing 20, surrounds one portion of the rack bar 14, supports the electric motor 18, and configures one portion of the reducer 19.

The pinion shaft 13 includes an input shaft 22, an output shaft 23, and a torsion bar 24. The input shaft 22 and the output shaft 23 are connected via the torsion bar 24 to each other on the same axial line. The input shaft 22 is continued via the intermediate shaft 6 and the steering shaft 4 to the steering wheel 3. At the end of the output shaft 23, the pinion teeth 13a are arranged. When the steering torque is input to the input shaft 22, the torsion bar 24 is deformed in an elastically twisted manner, and thereby, the input shaft 22 and the output shaft 23 are relatively rotated.

The torque sensor 16 is arranged in association with the torsion bar 24. The torque sensor 16 detects a torque based on a relative rotation displacement amount between the input shaft 22 and the output shaft 23 via the torsion bar 24. The torque detection results are applied to the ECU 17.

The ECU 17 controls the electric motor 18 based on the above-described torque detection results or a vehicle speed detection result, etc., applied from a speed sensor (not shown).

The electric motor 18 includes a motor housing 18a, and a rotation shaft 18b, being an output shaft, supported rotatably via a bearing by the motor housing 18a. The rotation shaft 18b of the electric motor 18 is placed in parallel to a direction in which the rack bar 14 extends.

The reducer 19 includes: a parallel shaft gear mechanism 19a for decelerating an output rotation of the electric motor 18 for a steering assist; and a ball thread mechanism 19, being a motion converting mechanism, for converting the output rotation of the parallel shaft gear mechanism 19a into a linear movement of the rack bar 14.

The parallel shaft gear mechanism 19a includes: a drive gear 25 driven by the electric motor 18; an idle gear 26, being an intermediate gear, driven by the drive gear 25; and a driven gear 27 driven by the idle gear 26.

The ball thread mechanism 19b includes a nut 28 driven by the driven gear 27 and a thread shaft 30 driven via a plurality of balls 29 by the nut 28. The ball thread mechanism 19b converts a rotational motion of the nut 28 into a linear motion of the thread shaft 30. The nut 28 includes a female screw. In order that the nut 28 and the driven gear 27 can rotate together, the nut 28 and the driven gear 27 are fixed to each other. The nut 28 is connected to the driven gear 27 to rotate together therewith. The thread shaft 30 includes a male screw. The thread shaft 30 is connected to the rack bar 14 to move together therewith. In the embodiment, the male screw of the thread shaft 30 is formed along an outer periphery of the rack bar 14, and the thread shaft 30 and the rack bar 14 are formed integrally.

When the steering wheel 3 is operated, the steering torque is detected by the torque sensor 16, and according to the torque detection result and the vehicle speed detection result, etc., the electric motor 18 generates the steering assist force. The steering assist force is transmitted via the reducer 19 to the rack bar 14, and together therewith, the motion of the steering wheel 3 is also conveyed to the rack bar 14. As a result, the steerable wheel 2 is steered, and also, the steering operation is assisted.

Figure 2:
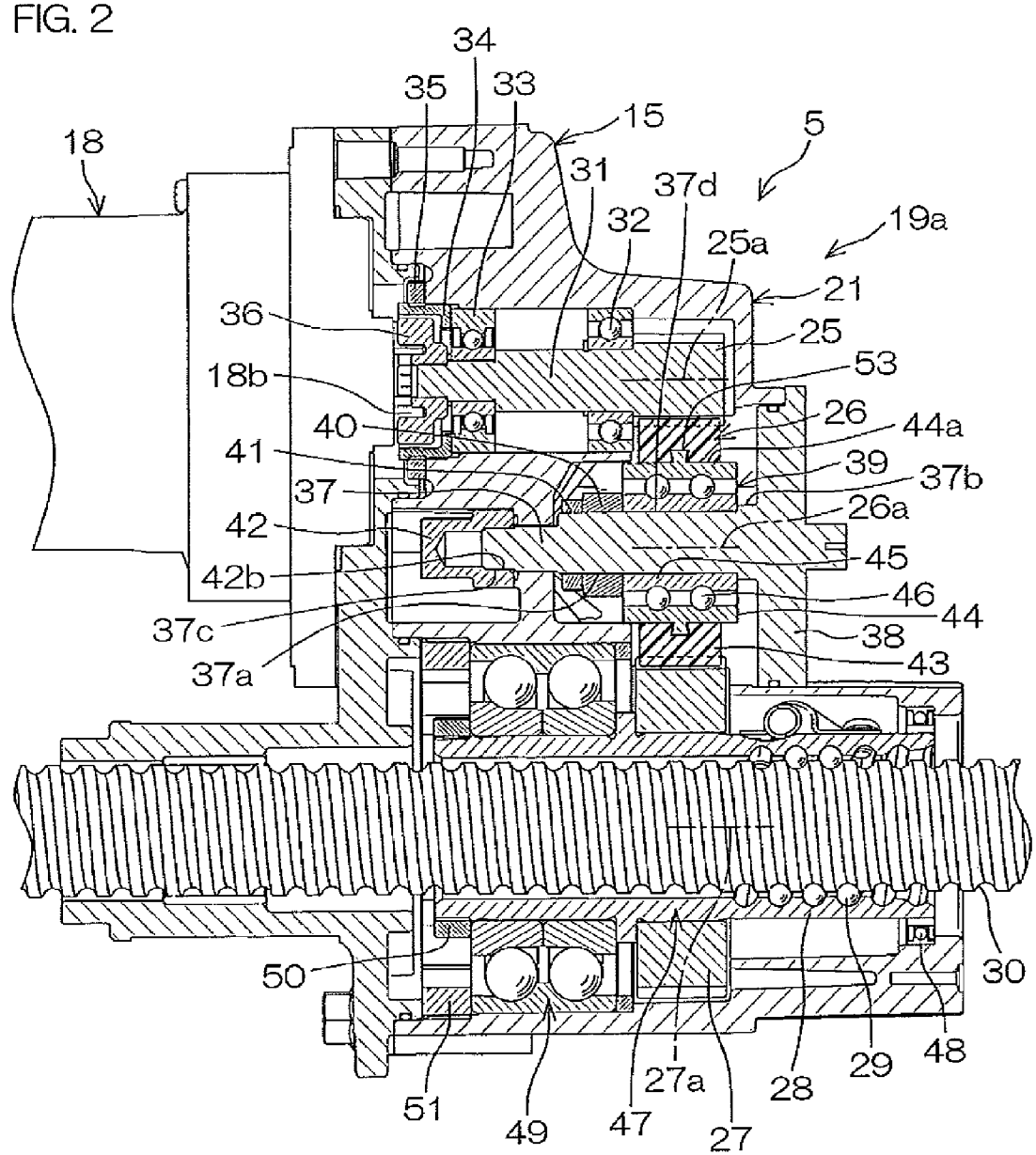
FIG. 2 is a cross-sectional view of relevant parts of a steering mechanism shown in FIG. 1.

FIG. 2 is a cross-sectional view of relevant parts of the steering mechanism shown in FIG. 1. With reference to FIG. 2, the electric power steering apparatus 1 includes: a drive gear spindle 31 for supporting the drive gear 25; a plurality of bearings 32 and 33 for rotatably supporting the drive gear 25; a fixing member 34 and a lock nut 35 for regulating an axial direction movement of the bearings 32 and 33; and a coupling 36 for connecting the drive gear spindle 31 to the rotation shaft 18b of the electric motor 18.

The drive gear 25 is composed of helical gears, and is formed from a metal in an approximately columnar shape. Along the outer periphery of the drive gear 25, a plurality of helical teeth are formed. The drive gear 25 is connected to one end of the drive gear spindle 31 so as to rotate together therewith. More specifically, the drive gear 25 and the drive gear spindle 31 are formed integrally as a single component by a single member. The drive gear spindle 31 is supported rotatably via the bearings 32 and 33 by the second housing 21. Also, the axial direction movement of the drive gear spindle 31 for the second housing 21 is regulated.

The electric power steering apparatus 1 includes: an intermediate shaft 37, being a spindle for supporting the idle gear 26; an end plate 38 arranged in the intermediate shaft 37; a bearing 39, composed of a rolling bearing, which is supported by the intermediate shaft 37 and which rotatably supports the idle gear 26; a fixing member 40 and a lock nut 41 for regulating an axial direction movement of the bearing 39 for the intermediate shaft 37; and a fastening member 42 for fixing the intermediate shaft 37 to the second housing 21.

Figure 3:
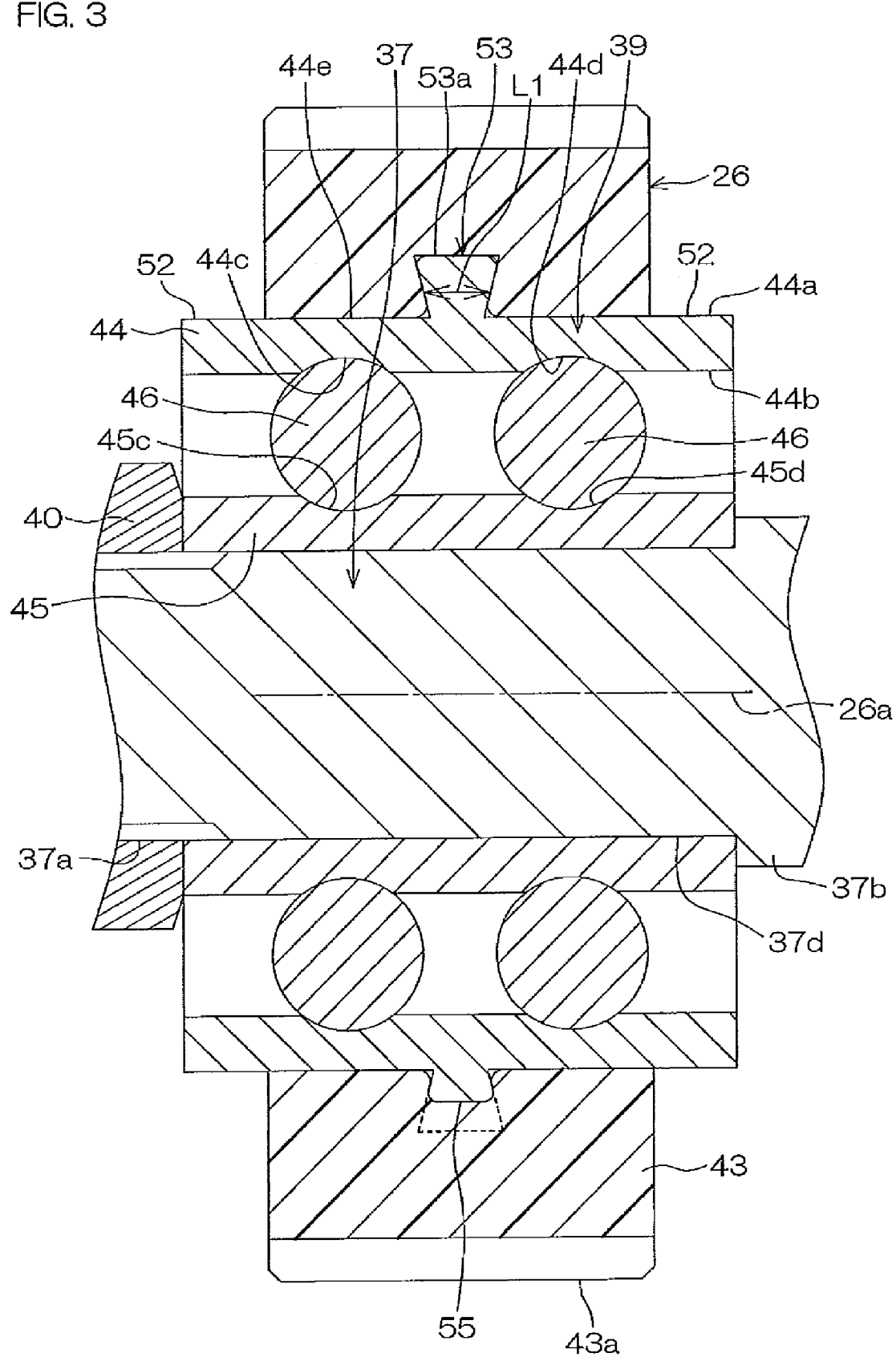
FIG. 3 is an enlarged view of the relevant parts in FIG. 2.

FIG. 3 is an enlarged diagram of the relevant parts in FIG. 2, and primarily shows the idle gear 26. With reference to FIG. 2 and FIG. 3, the idle gear 26 is arranged in a synthetic resin member 43. That is, the synthetic resin member 43 is formed in a cylindrical shape. Along the outer periphery 43a of the synthetic resin member 43, a plurality of helical teeth, being a tooth portion, are formed. The synthetic resin member 43 is connected to an outer ring 44 of the bearing 39 to rotate together therewith. More specifically, the synthetic resin member 43 is integrally formed to the outer ring 44 of the bearing 39 for fixation.

The bearing 39 is a single double-row bearing. The bearing 39 includes: a single outer ring 44; a single inner ring 45; and a plurality of balls 46 as rolling bodies which are interposed to freely roll between the inner ring 45 and the outer ring 44 and which form two ball columns.

The outer ring 44 is composed of a single annular member, and is formed (from a metal such as steel) in a cylindrical shape. The outer ring 44 extends by a predetermined length in a direction (axial direction) along a center axial line 26a of the idle gear 26. The outer ring 44 includes an outer peripheral surface 44a and an inner peripheral surface 44b.

On the inner peripheral surface 44b of the outer ring 44, two columns of raceway grooves 44c and 44d are formed. A pair of raceway grooves 44c and 44d are spaced apart from each other by a predetermined distance in an axial direction. On the outer peripheral surface of the inner ring 45, two columns of raceway grooves 45c and 45d are formed. A pair of raceway grooves 45c and 45d are spaced apart from each other by a predetermined distance in an axial direction.

One raceway groove 44c of the outer ring 44 and one raceway groove 45c of the inner ring 45 are faced to each other along a radial direction. Between both raceway grooves 44c and 45c, a plurality of balls 46, being a single ball column, are annularly held. Further, the other raceway groove 44d of the outer ring 44 and the other raceway groove 45d of the inner ring 45 are faced to each other along a radial direction. Between both raceway grooves 44d and 45d, a plurality of balls 46, being a single ball column, are annularly held.

The outer peripheral surface 37d of the intermediate shaft 37 supports rotatably the idle gear 26 via the bearing 39. On the outer peripheral surface 37d of the intermediate shaft 37, a male screw 37a, being an engaging portion, is formed. To the male screw 37a, the fixing member 40 and the lock nut 41 are fixed through screw-fitting. The intermediate shaft 37 includes a step 37b. Between the step 37b and the fixing member 40, the inner ring 45 of the bearing 39 is sandwiched in a state of being fitted onto the outer peripheral surface 37d of the intermediate shaft 37. Thereby, the movement of the bearing 39 for the intermediate shaft 37 in the axial direction is regulated.

The intermediate shaft 37 and the end plate 38 are formed integrally, configure a single component as a spindle, and are supported by the second housing 21 in a fixed state. The fastening member 42 includes a female screw 42b. The female screw 42b is screwed into the male screw 37c, being an engaging portion of the end of the intermediate shaft 37. When the fastening member 42 is screwed into the intermediate shaft 37, the end plate 38 comes in contact with an end surface of the second housing 21, and the end plate 38 and the fastening member 42 clamp the second housing 21 in therebetween. As a result, the intermediate shaft 37 is fixed to the second housing 21.

With reference to FIG. 2, the electric power steering apparatus 1 includes: a driven gear spindle 47 for supporting the driven gear 27; a plurality of bearings 48 and 49 for rotatably supporting the driven gear 27; and two fixing members 50 and 51 for regulating an axial direction movement of the bearings 48 and 49.

The second housing 21 holds the two bearings 48 and 49. The two bearings 48 and 49 rotatably support the driven gear spindle 47. Into the male screw of the driven gear spindle 47, the female screw of the fixing member 50 is screw-fitted. This regulates the axial direction movement of the bearing 49 for the driven gear spindle 47. Also, into the second housing 21, the fixing member 51 is screw-fitted. This regulates the axial direction movement of the bearing 49 for the second housing 21. In order that the driven gear spindle 47 and the driven gear 27 are rotated together, the driven gear spindle 47 and the driven gear 27 are fixed to each other. Also, the driven gear spindle 47 supports the driven gear 27. In order that the driven gear spindle 47 and the nut 28 are rotated together, the driven gear spindle 47 and the nut 28 are connected to each other. In the present embodiment, the driven gear spindle 47 and the nut 28 are formed integrally.

The driven gear 27 is annularly formed from a metal. Along the outer periphery of the cylindrical shape of the driven gear 27, a plurality of helical teeth are formed.

The rack bar 14, the thread shaft 30, the nut 28, the driven gear spindle 47, the driven gear 27, the pair of bearings 48 and 49 are placed coaxially to one another, and are supported by the second housing 21.

In the present embodiment, the parallel shaft gear mechanism 19a includes: the drive gear spindle 31, being an input shaft; the intermediate shaft 37; and the driven gear spindle 47, being an output shaft. The intermediate shaft 37 is placed in parallel to the drive gear spindle 31. The driven gear spindle 47 is placed in parallel to the drive gear spindle 31. The drive gear spindle 31, the rotation shaft 18b of the electric motor 18, and the drive gear 25 are placed on the same axial line to one another.

A center axial line 25a of the drive gear 25 and a center axial line 26a of the idle gear 26 are placed in parallel to each other. A center axial line 26a of the idle gear 26 and a center axial line 27a of the driven gear 27 are placed in parallel to each other. There is a predetermined distance between the rotation axis 18b of the electric motor 18 and the rack bar 14. While the predetermined distance can be set to a minimum value according to the outer shape of the electric motor 18 and a maximization of the driven gear 27 is suppressed, a required speed reduction ratio can be realized. This reduces the size of the outer shape of the steering mechanism 5 and the reducer 19.

With reference to FIG. 2 and FIG. 3, in the present embodiment, the idle gear 26 and the outer ring 44 of the bearing 39 are integrated. The synthetic resin member 43 of the idle gear 26 is formed by an injection molding process using a mold in a manner to cover an intermediate portion 44e, being one portion of the outer peripheral surface 44a of the outer ring 44 in the axial direction.

More specifically, the outer ring 44 is insert molded by the synthetic resin member 43. The outer ring 44 is inserted, as a cored bar, within a metal mold at the time of resin-molding the idle gear 26, for example. The outer ring 44 functions as one portion of a forming mold when molding the idle gear 26 by the resin member. When the synthetic resin member in a melted state is injection-molded (insert-molded) in the state where the outer ring 44 as a mold insert is inserted within the metal mold, the synthetic resin member is filled within the forming mold. When the synthetic resin member within the forming mold is solidified, the synthetic resin member 43, being a molded product, is obtained. The obtained synthetic resin member 43 covers the outer peripheral surface 44a of the outer ring 44. When the synthetic resin member 43 is molded along therewith, the outer ring 44 and the idle gear 26 are joined in a manner to rotate together.

The synthetic resin member 43 includes a connecting portion that is connected to the outer peripheral surface 44a while contacting the outer peripheral surface 44a of the outer ring 44, and an annular tooth portion formed with gear teeth. The connecting portion is formed along the inner periphery of the synthetic resin member 43 and the tooth portion is formed along the outer periphery.

Figure 4:
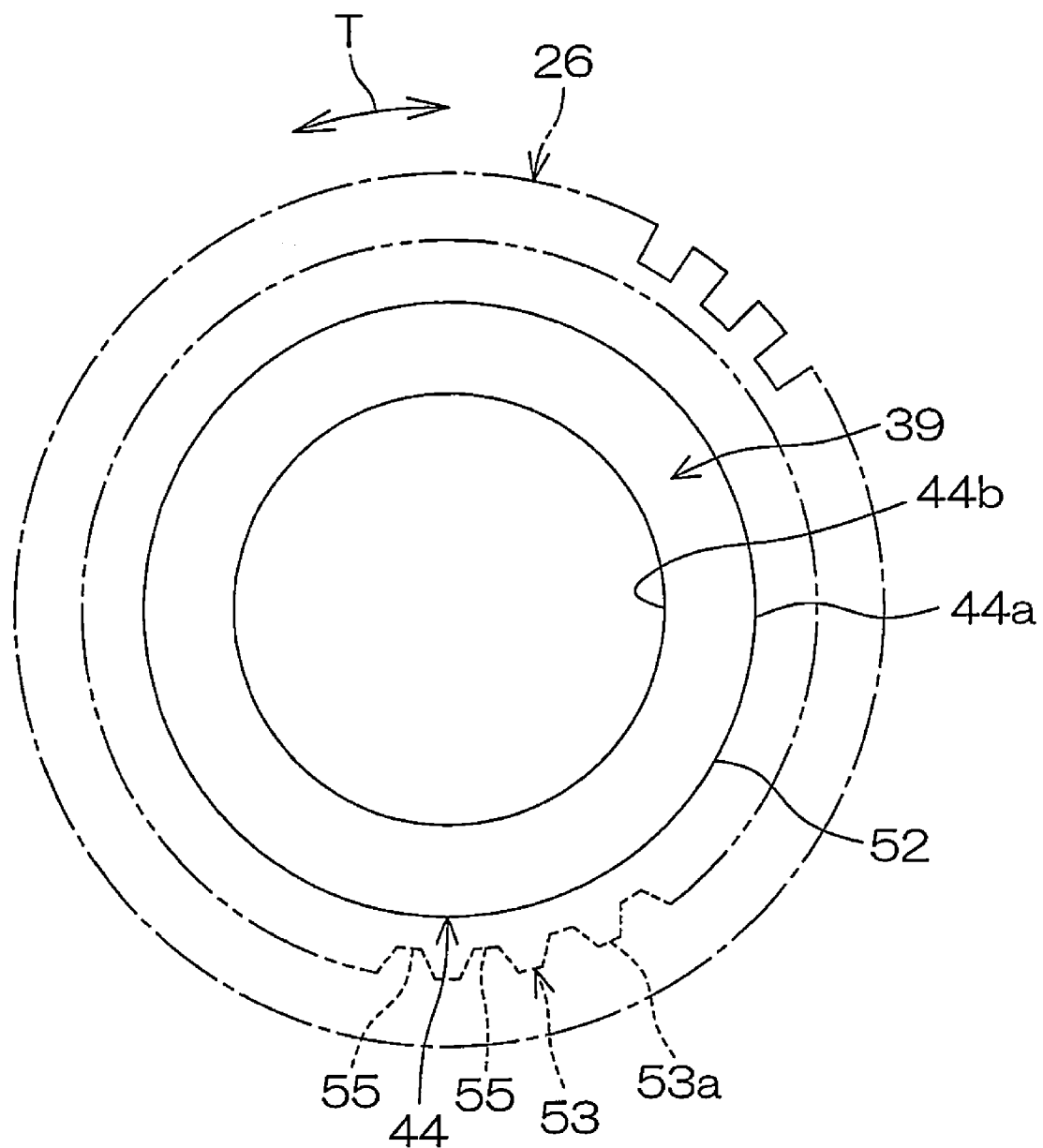
FIG. 4 is a laterally-viewed schematic diagram of an idle gear and a bearing shown in FIG. 3.

FIG. 4 is a laterally-viewed schematic diagram of the idle gear and the bearing. With reference to FIG. 3 and FIG. 4, the outer peripheral surface 44a of the outer ring 44 includes two cylindrical surfaces 52 and a single projection 53 as a swelled portion and also as a convex portion. The two cylindrical surfaces 52 are placed at both ends in the axial direction. The projection 53 is placed at the center only in the axial direction. The projection 53 and the two cylindrical surfaces 52 are formed integrally. The intermediate portion 44e, being one portion of the outer peripheral surface 44a in the axial direction, i.e., a whole of the projection 53, and one portion of the two cylindrical surfaces 52 a portion of the cylindrical surfaces 52 adjacent to the projection 53, is covered with the synthetic resin member 43.

The projection 53 is formed to protrude radially outwardly from the cylindrical surface 52. The projection 53 extends endlessly in succession along a circumferential direction T. Further, the cross section of the projection 53 in the cross section parallel to the axial direction and parallel to the radial direction is a trapezoidal shape (or a sector shape), being a wedge shape, and a width L1 i.e., axial direction dimension of the projection 53 is longer toward a radially outward direction. Further, the projection 53 includes a pair of sides. In the cross section parallel to the axial direction and parallel to the radial direction, these sides form an acute angle relative to the cylindrical surface 52.

The projection 53 functions as a regulating portion for regulating relative rotation between the outer ring 44 and the synthetic resin member 43. That is, at a top 53a of the projection 53, a plurality of concave portions 55 are formed. Each concave portion 55 is indented from the top 53a, and functions as a portion extending in a direction to cross the circumferential direction T. The plurality of concave portions 55 are aligned along the circumferential direction T with equal intervals. In the circumferential direction T, the two adjacent concave portions 55 are placed to be spaced apart by a predetermined distance. The cross-section of the concave portion 55 in the cross section vertical to the axial direction is the same in shape as that of a tooth groove of an involute spline. Within the concave portion 55, one portion of the synthetic resin member 43 is intruded. The relative rotation between the outer ring 44 and the synthetic resin member 43 is regulated.

With reference to FIG. 2 and FIG. 3, the electric power steering apparatus 1 of the present embodiment is provided with the parallel shaft gear mechanism 19a for decelerating the output rotation of the electric motor 18 for a steering assist. The parallel shaft gear mechanism 19a includes the idle gear 26 rotatably supported via the bearing 39, being a rolling bearing, on the outer peripheral surface 37d of the intermediate shaft 37, being a spindle, supported by the rack housing 15. The idle gear 26 is arranged in the annular synthetic resin member 43 fixed on the outer peripheral surface 44a of the outer ring 44 of the rolling bearing 39. On the outer peripheral surface 44a of the outer ring 44, a regulating portion (in the present embodiment, this is equivalent to the projection 53 with the concave portion 55) for regulating the relative rotation between the outer peripheral surface 44a and the synthetic resin member 43 is arranged. The synthetic resin member 43 is formed in a manner to cover the regulating portion of the outer peripheral surface 44a of the outer ring 44 as a result of the injection molding process.

By resin-molding the synthetic resin member 43 in which the idle gear 26 is arranged, molding of the synthetic resin member 43 and fixing of the idle gear 26 to the outer ring 44 can be collectively achieved. Thus, labor for assembly can be alleviated. Further, the number of components can be reduced. As a result, manufacturing cost can be decreased. Due to a vibration-prevention effect of the synthetic resin member 43, the generation of abnormal noise associated with the idle gear 26 can be suppressed. For example, when forming gear teeth in the synthetic resin member 43, the generation of a tooth-meshing sound or a tooth-striking sound can be decreased. Further, the regulating portion can be utilized to fix the synthetic resin member 43 of the idle gear 26 to the outer ring 44, and thus, the generation of chatter of the idle gear 26 can be suppressed. As a result, the generation of abnormal noise resulting from chatter can be suppressed. The synthetic resin member 43 is directly formed on the outer ring 44, and thus, the gear teeth of the idle gear 26 are placed with high accuracy relative to the center axial line of the bearing 39. As a result, the meshing sound of the gear teeth during rotation is decreased, and also, torque unevenness of the idle gear 26 can be decreased, thereby improving a steering feeling. The bearing 39 can be placed radially internally of the idle gear 26, and thus, the size of the reducer 19 can be reduced.

The projection 53, being the regulating portion, is formed on the outer peripheral surface 44a of the outer ring 44, and extends annularly along the circumferential direction T. In this case, the projection 53 is easily formed, and thus, manufacturing cost can be decreased.

In the projection 53, being the regulating portion, the concave portion 55 for regulating the relative rotation between the outer ring 44 and the synthetic resin member 43 is formed. Thereby, the relative rotation between the outer ring 44 and the synthetic resin member 43 is reliably regulated.

The cross section of the projection 53 is in a wedge shape so that the width L1 in the axial direction of the outer ring 44 is wider toward a radially outward direction of the outer ring 44. This regulates the radially outward relative movement of the synthetic resin member 43 for the outer ring 44. As the wedge shape, a trapezoidal shape is adopted. This facilitates the formation of the projection 53.

The outer ring 44 includes the inner peripheral surface 44b, and on the inner peripheral surface 44b of the outer ring 44, double-row raceway grooves 44c and 44d are formed. In this case, the idle gear 26 is stably supported, and thus, the generation of chatter of the idle gear 26 is suppressed. As a result, the generation of abnormal noise resulting from chatter can be suppressed.

Further, in the present embodiment, the parallel shaft gear mechanism 19a is configured to include: the drive gear spindle 31, being the input shaft, placed coaxially to the rotation shaft 18b of the electric motor 18; the intermediate shaft 37 placed in parallel to the drive gear spindle 31; the driven gear spindle 47, being the output shaft, placed in parallel to the drive gear spindle 31; the drive gear 25 arranged in the drive gear spindle 31; and the driven gear 27 arranged in the driven gear spindle 47. This suppresses the generation of abnormal noise in the parallel shaft gear mechanism 19a, decreasing the manufacturing cost.

With respect to the present embodiment, modified examples described below may be conceivable. In the descriptions below, points different from those in the above-described embodiment will be mainly described. In addition, the description as to the similar configurations will be omitted, and the same reference numerals will be assigned to the already illustrated components.

Figure 5:
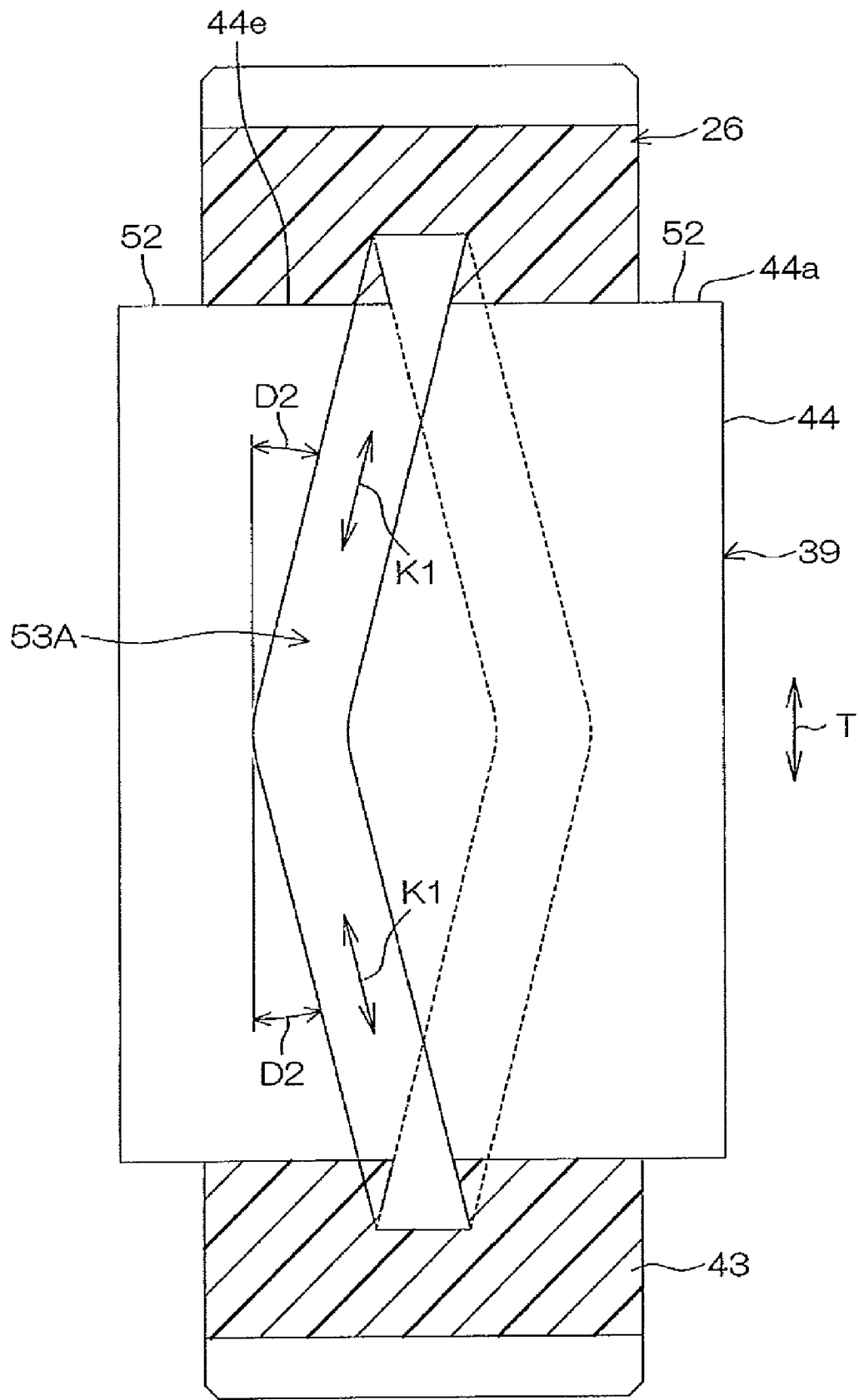
FIG. 5 is a partial cross-sectional view of an idle gear including a first modified example of a projection and an outer ring of a bearing, in which only a synthetic resin member is shown in cross section.

For example, FIG. 5 is a partial cross-sectional view of the idle gear 26 including a projection 53A, being a first modified example of the projection, and the outer ring 44 of the bearing 39, in which only the synthetic resin member 43 is shown in cross section. With reference to FIG. 5, the projection 53A is arranged instead of the above-described projection 53. The projection 53A extends along a direction K1 inclined relative to the circumferential direction T. The inclination direction K1 forms a predetermined inclination angle D2 relative to the circumferential direction T. The inclination angle D2 of the projection 53A is constant (not zero) in the circumferential direction T, and changes in opposite directions at two locations that are opposite to each other in the middle of a direction in which the projection 53A extends. The projection 53A is formed endlessly in the circumferential direction T. The concave portion 55 is eliminated. Except for these points, the projection 53A of the present modified example is configured identically to the projection 53 in the above-described embodiment.

The projection 53A, being a regulating portion, is inclined relative to the circumferential direction T, and thus, the relative rotation between the outer ring 44 and the synthetic resin member 43 is reliably regulated. The projection 53A is annular, and thus, the formation of the projection 53A is easy.

Figure 6:
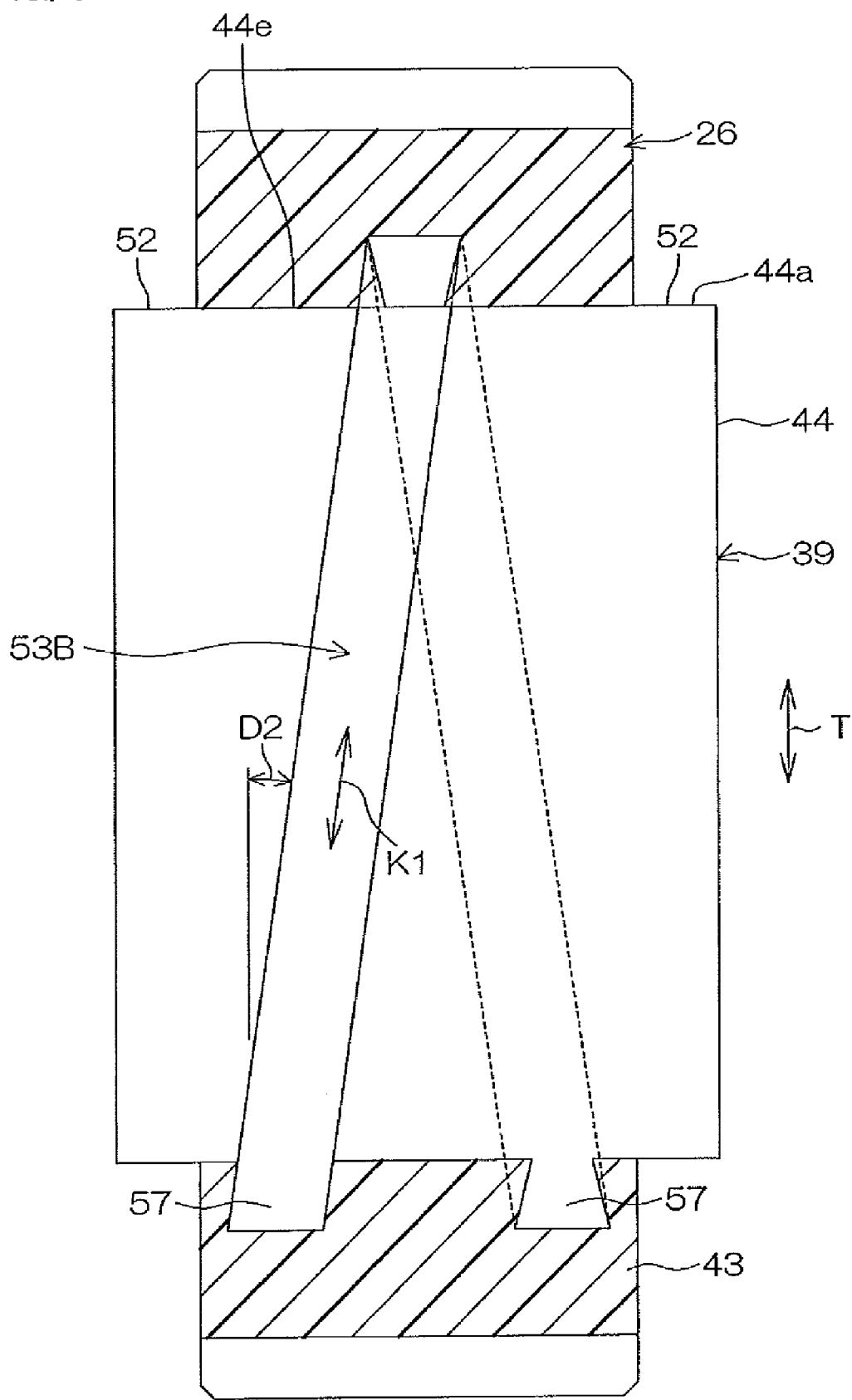
FIG. 6 is a partial cross-sectional view of an idle gear including a second modified example of a projection and an outer ring of a bearing, in which only a synthetic resin member is shown in cross section.

FIG. 6 is a partial cross-sectional view of the idle gear 26 including a projection 53B, being a second modified example of the projection, and the outer ring 44 of the bearing 39, in which only the synthetic resin member 43 is shown in cross section. With reference to FIG. 6, the projection 53B is arranged instead of the projection 53. The projection 53B extends spirally along the inclination direction K1 inclined relative to the circumferential direction T. The inclination direction K1 forms a predetermined inclination angle D2 relative to the circumferential direction T. The inclination angle D2 of the projection 53 is constant (not zero) in the circumferential direction T. The projection 53B is formed to have an end in the circumferential direction T. The concave portion 55 is eliminated. Except for these points, the projection 53B of the present modified example is configured identically to the projection 53 in the above-described embodiment.

The spiral projection 53B, being the regulating portion, has a pair of ends 57. In this case, the relative rotation between the outer ring 44 and the synthetic resin member 43 is reliably regulated.

Figure 7:
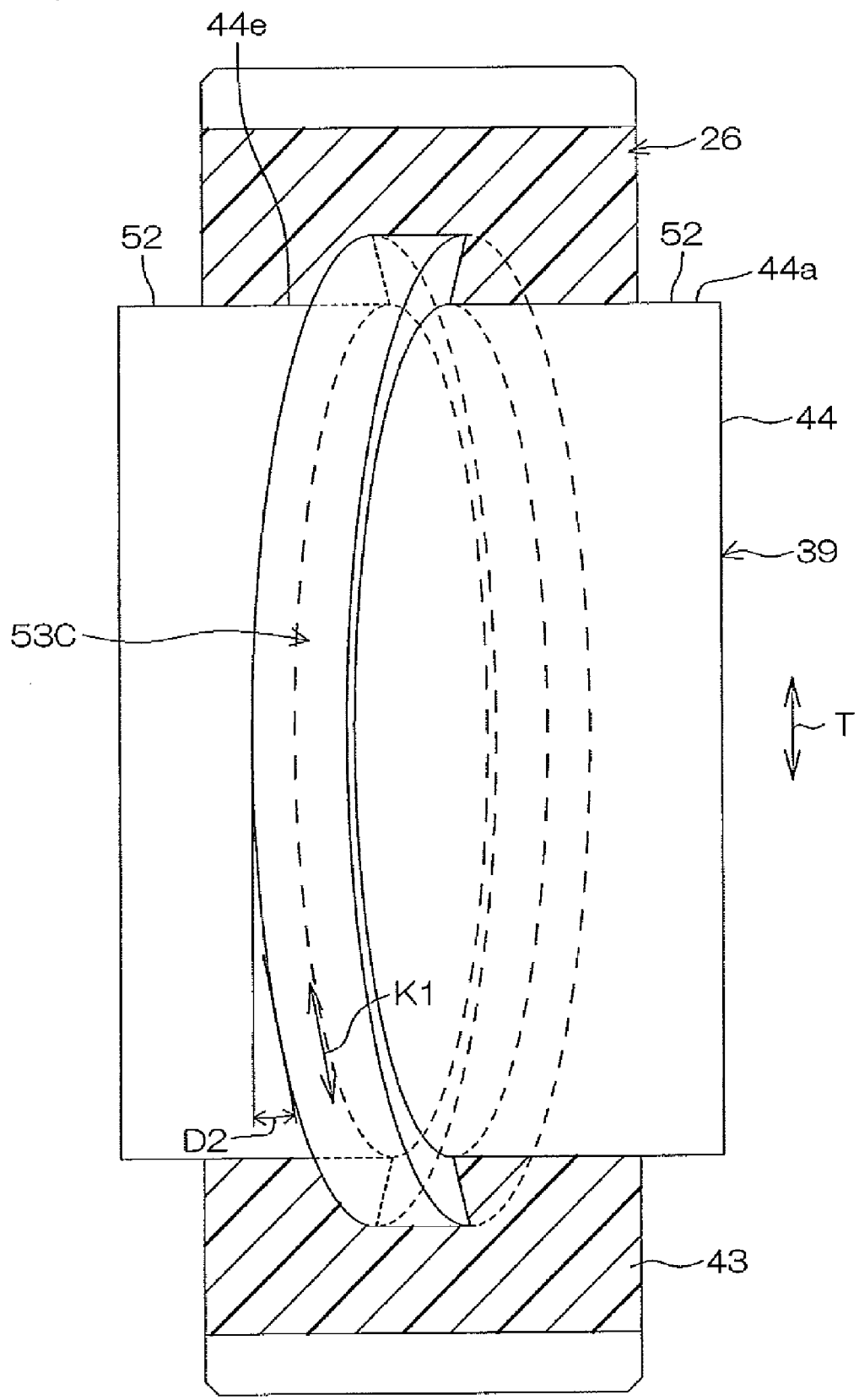
FIG. 7 is a partial cross-sectional view of an idle gear including a third modified example of a projection and an outer ring of a bearing, in which only a synthetic resin member is shown in cross section.

FIG. 7 is a partial cross-sectional view of the idle gear 26 including a projection 53C, being a third modified example of the projection, and the outer ring 44 of the bearing 39, in which only the synthetic resin member 43 is shown in cross section. With reference to FIG. 7, the projection 53C is arranged instead of the projection 53. The projection 53C is in an endless ring shape, and is in a generally elliptical shape, for example. The projection 53C extends along a line of intersection between a plane inclined by a predetermined angle relative to the axial direction of the outer ring 44 and a cylindrical surface of the outer periphery of the outer ring. A radially inward portion of the projection 53C contacts the cylindrical surface 52 of the outer peripheral surface 44a of the outer ring 44. The above-described elliptical shape is similar (in shape) to a cut shape of the cylindrical surface 52 in a cut plane inclined obliquely relative to the center axial line of the cylindrical surface 52.

The projection 53C extends along an inclination direction K1 inclined relative to the circumferential direction T. The inclination direction K1 forms an inclination angle D2 relative to the circumferential direction T, and the inclination angle D2 of the projection 53C changes in the circumferential direction T and reaches zero at two positions in the circumferential direction T. The concave portion 55 is eliminated. Except for these points, the projection 53C of this modified example is configured identically to the projection 53 in the above-described embodiment.

The projection 53C, being a regulating portion, is inclined relative to the circumferential direction T, and thus, the relative rotation between the outer ring 44 and the synthetic resin member 43 is reliably regulated. The projection 53C is annular, and thus, the formation of the projection 53C is easy.

Figure 8:
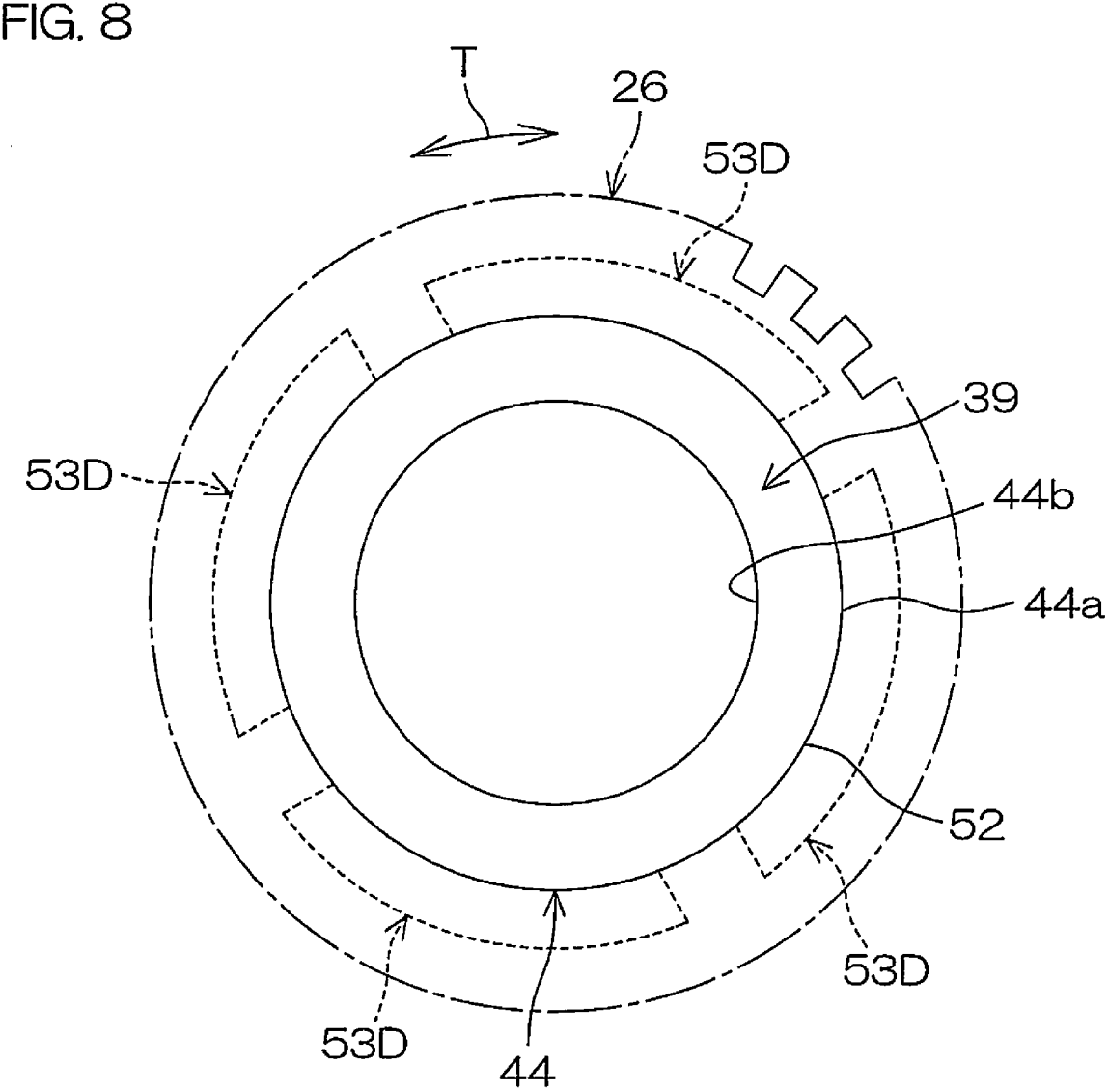
FIG. 8 is a laterally-viewed schematic diagram of an idle gear including a fourth modified example of a projection and a bearing.

FIG. 8 is a laterally-viewed schematic diagram of the idle gear 26 including a plurality of projections 53D, being a fourth modified example of the projection, and the bearing 39. With reference to FIG. 8, the plurality of projections 53D are arranged instead of the projection 53. The plurality of projections 53D have the same shape to one another, and are formed at a plurality of locations spaced apart from one another in the circumferential direction T. The two projections 53D adjacent in the circumferential direction T are spaced apart from each other in the circumferential direction. The concave portion 55 is eliminated. Except for these points, the projections 53D of the present modified example are configured identically to the projection 53 in the above-described embodiment.

The plurality of projections 53D, being regulating portions, are a plurality of convex portions placed with certain intervals in the circumferential direction T. In this case, the relative rotation between the outer ring 44 and the synthetic resin member 43 is reliably regulated.

Figure 9:
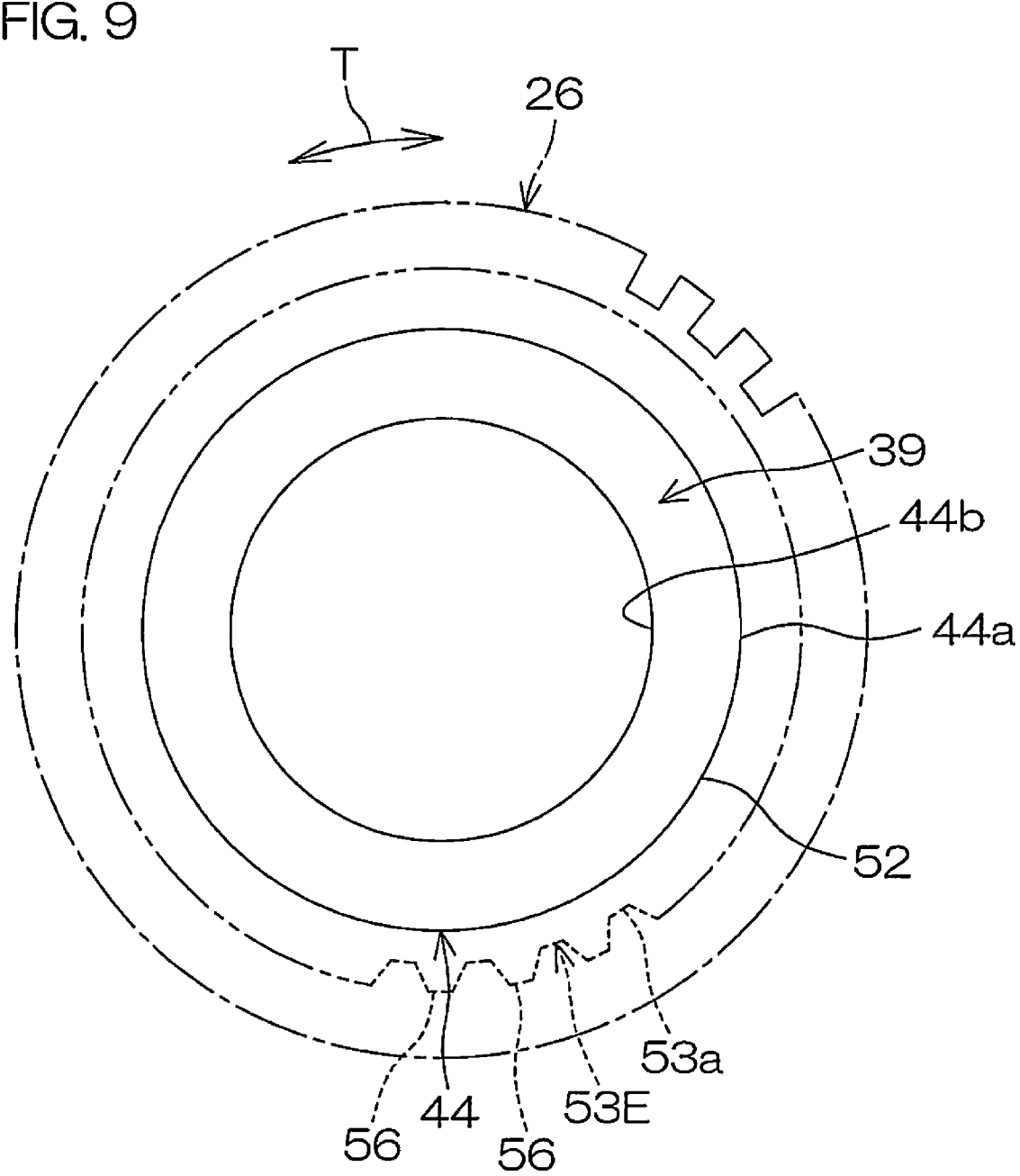
FIG. 9 is a laterally-viewed schematic diagram of an idle gear including a fifth modified example of a projection and a bearing.

FIG. 9 is a laterally-viewed schematic diagram of the idle gear 26 including a projection 53E, being a fifth modified example of the projection, and the bearing 39. With reference to FIG. 9, the projection 53E is arranged instead of the projection 53. The projection 53E is configured identically to the above-described projection 53, but instead of the plurality of concave portions 55, a plurality of convex portions 56 are formed.

A top 53a of the projection 53E includes the plurality of convex portions 56 and the remaining portion other than the convex portions 56. Each convex portion 56 is protruded radially outwardly from the remaining portion of the top 53a of the projection 53E. The plurality of convex portions 56 are aligned along the circumferential direction T with equal intervals. The cross-sectional shape of the convex portion 56 in the cross section vertical to the axial direction is the same as that of a tooth of an involute spline. Between the two convex portions 56 adjacent to each other along the circumferential direction T, one portion of the synthetic resin member 43 is intruded. This regulates the relative rotation between the outer ring 44 and the synthetic resin member 43. Except for these points, the projection 53E of the present modified example is configured identically to the projection 53 in the above-described embodiment.

As a regulating portion, the annular projection 53E with the convex portion 56 is arranged. The projection 53E is formed with the convex portion 56 for regulating the relative rotation between the outer ring 44 and the synthetic resin member 43. Thereby, the relative rotation between the outer ring 44 and the synthetic resin member 43 is reliably regulated. Further, the projection 53E extends annularly along the circumferential direction T, and thus, the formation of the projection 53E is easy.

Figure 10:
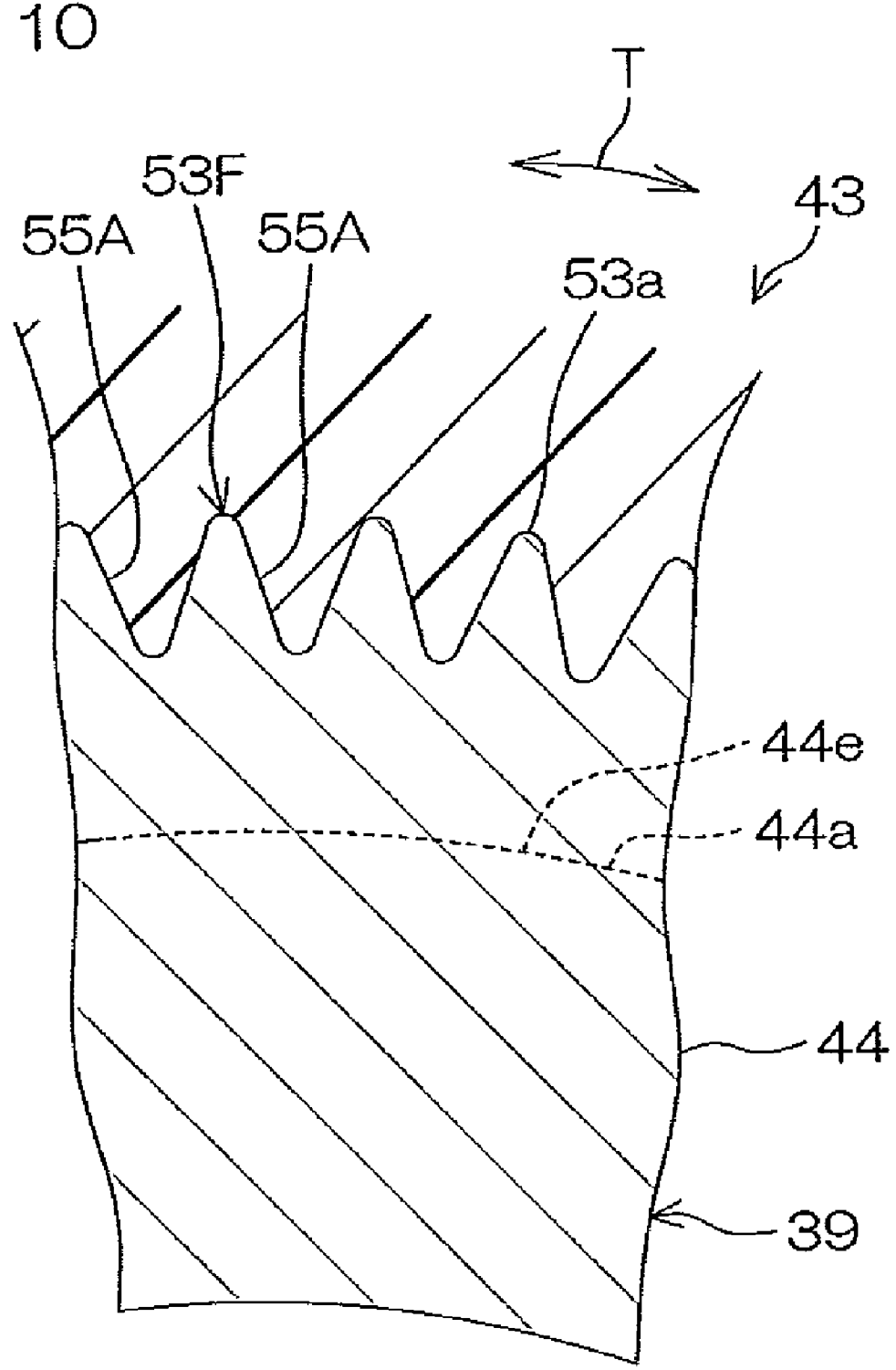
FIG. 10 is a cross-sectional view of an idle gear including a sixth modified example of a projection and a bearing, showing a cross section vertical to an axial direction.

FIG. 10 is a cross-sectional view of the idle gear 26 including a projection 53F, being a sixth modified example of the projection, and the bearing 39, and shows the cross section vertical to the axial direction. With reference to FIG. 10, the projection 53F is arranged instead of the projection 53. The projection 53F is configured identically to the above-described projection 53, but instead of the plurality of concave portions 55, a plurality of concave portions 55A are formed. The plurality of concave portions 55A are indented radially inwardly, are aligned equally along the circumferential direction T, and are placed adjacent to one another. The cross-sectional shape of the concave portion 55A in the cross section vertical to the axial direction is the same as that of a tooth groove of a serration. The teeth of the serration are in a triangular shape in cross section, and are placed adjacent along the circumferential direction T. The tooth groove of the serration is formed between the two teeth adjacent in the circumferential direction and formed in a V-lettered shape (a triangular shape). The concave portion 55A functions similar to the concave portion 55. Therefore, the projection 53F, being a regulating portion, functions similar to the projection 53.

Figure 11:
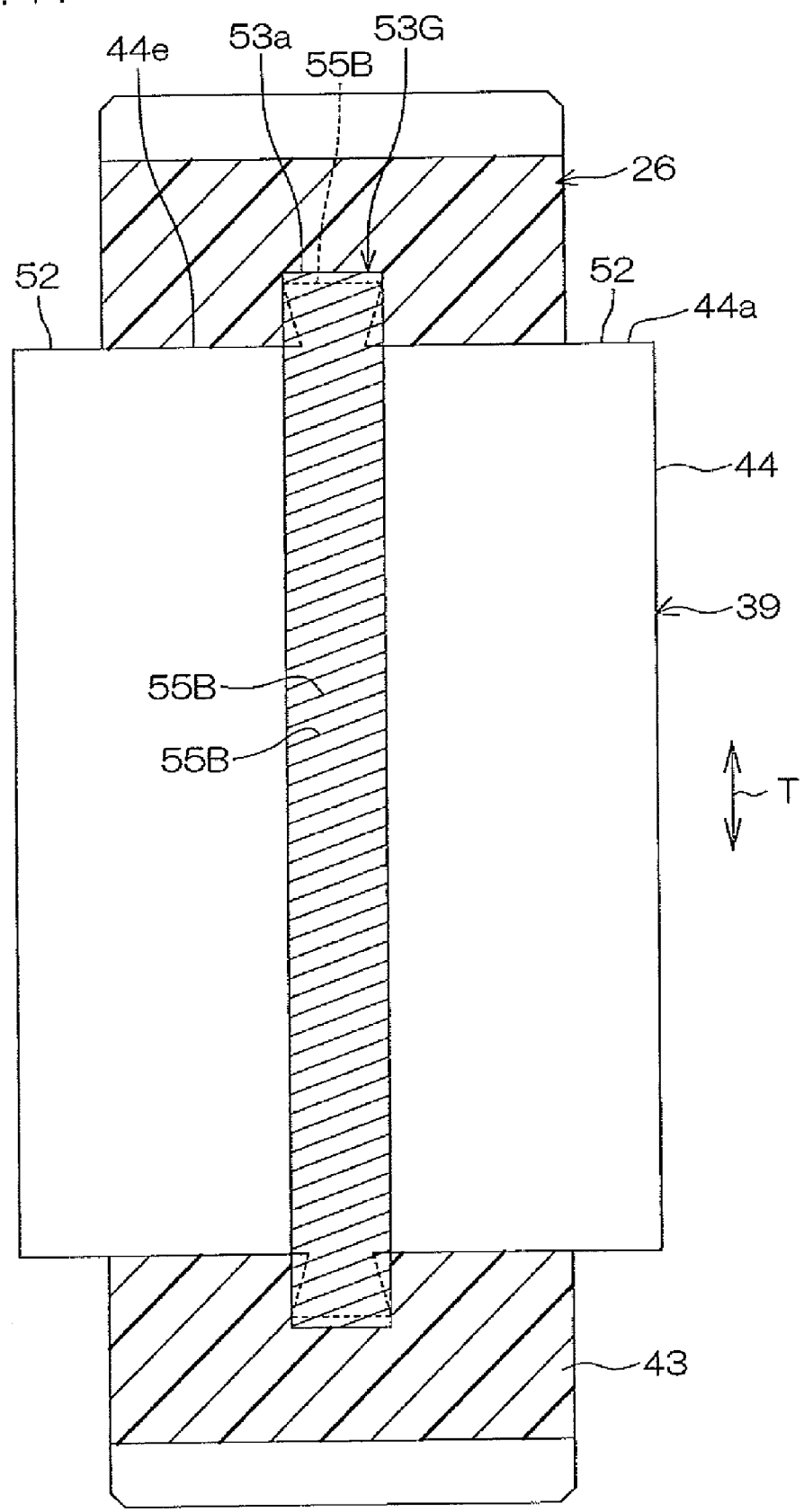
FIG. 11 is a partial cross-sectional view of an idle gear including a seventh modified example of a projection and a bearing, in which only a synthetic resin member is shown in cross section.

FIG. 11 is a partial cross-sectional view of the idle gear 26 including a projection 53G, being a seventh modified example of the projection, and the bearing 39, in which only the synthetic resin member 43 is shown in cross section. With reference to FIG. 11, the projection 53G is arranged instead of the projection 53. The projection 53G is configured identically to the above-described projection 53, but instead of the plurality of concave portions 55, a plurality of concave portions 55B are formed. The plurality of concave portions 55B are indented radially inwardly, are aligned equally along the circumferential direction T, and are placed adjacent to one another. The plurality of concave portions 55B are formed with a large number of grooves of which the outer peripheral surface 44a of the outer ring 44 is formed by knurling. The large number of grooves extend in a direction to cross the circumferential direction T, for example, in a direction to be inclined both in the axial direction and in the circumferential direction T. In addition, the large number of grooves may include a plurality of grooves crossing one another. The concave portion 55B functions similar to the concave portion 55, and the projection 53G, being a regulating portion, functions similar to the projection 53.

Similar to the concave portions 55A and 55B, the shape of the convex portion 56 of the projection 53E may be that of the teeth of the serration or may be that of the projection formed by knurling.

Further, the cross-sectional shape of the projection 53 in the cross section including the axial direction of the outer ring 44 may be semi-circular, triangular, or rectangular such as a rectangle and a square. These shapes may be applied to the projections 53A, 53B, 53C, 53D, 53E, 53F, and 53G.

Figure 12:
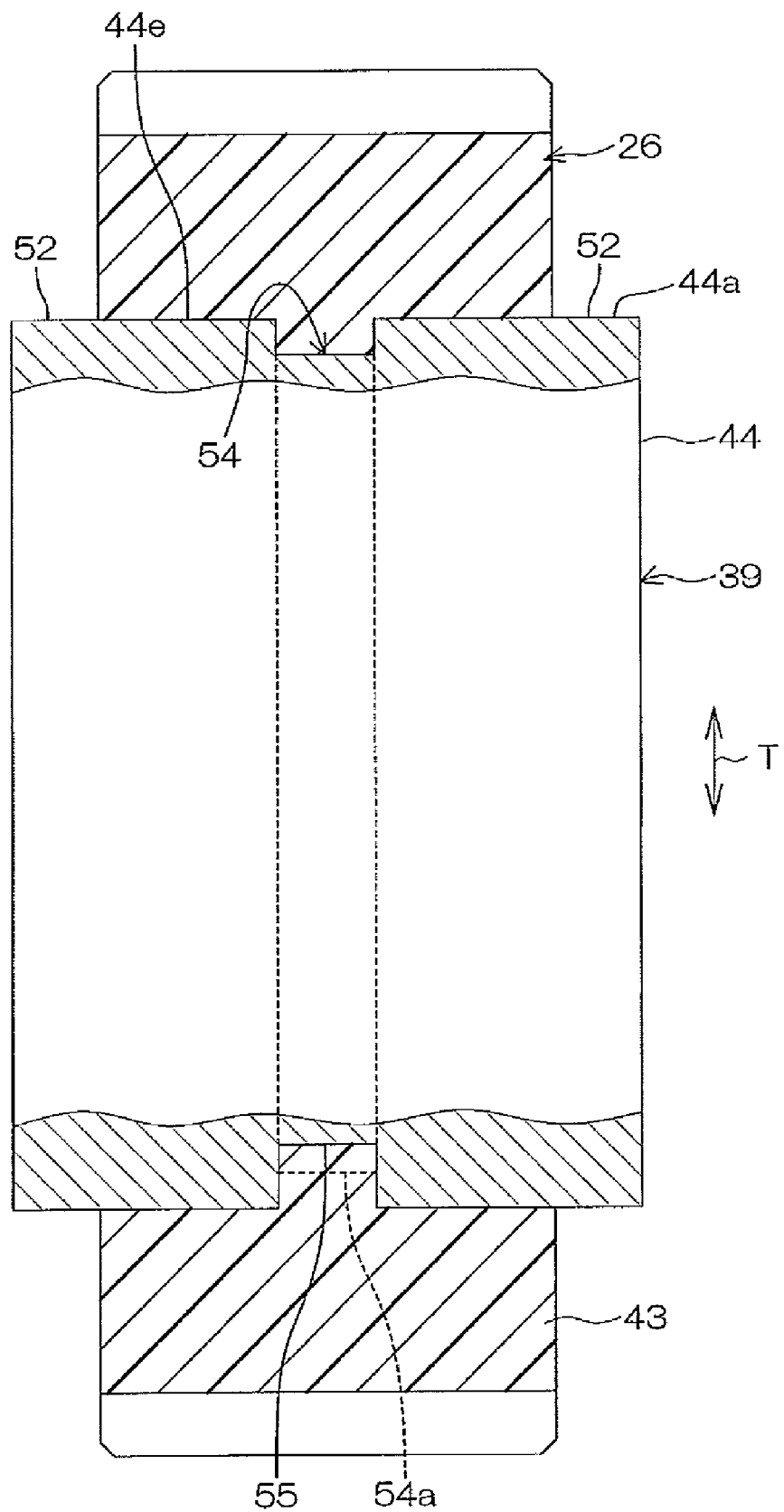
FIG. 12 is a cross-sectional view of one portion of an idle gear including a groove of a modified example of a regulating portion and an outer ring of a bearing.
Figure 13:
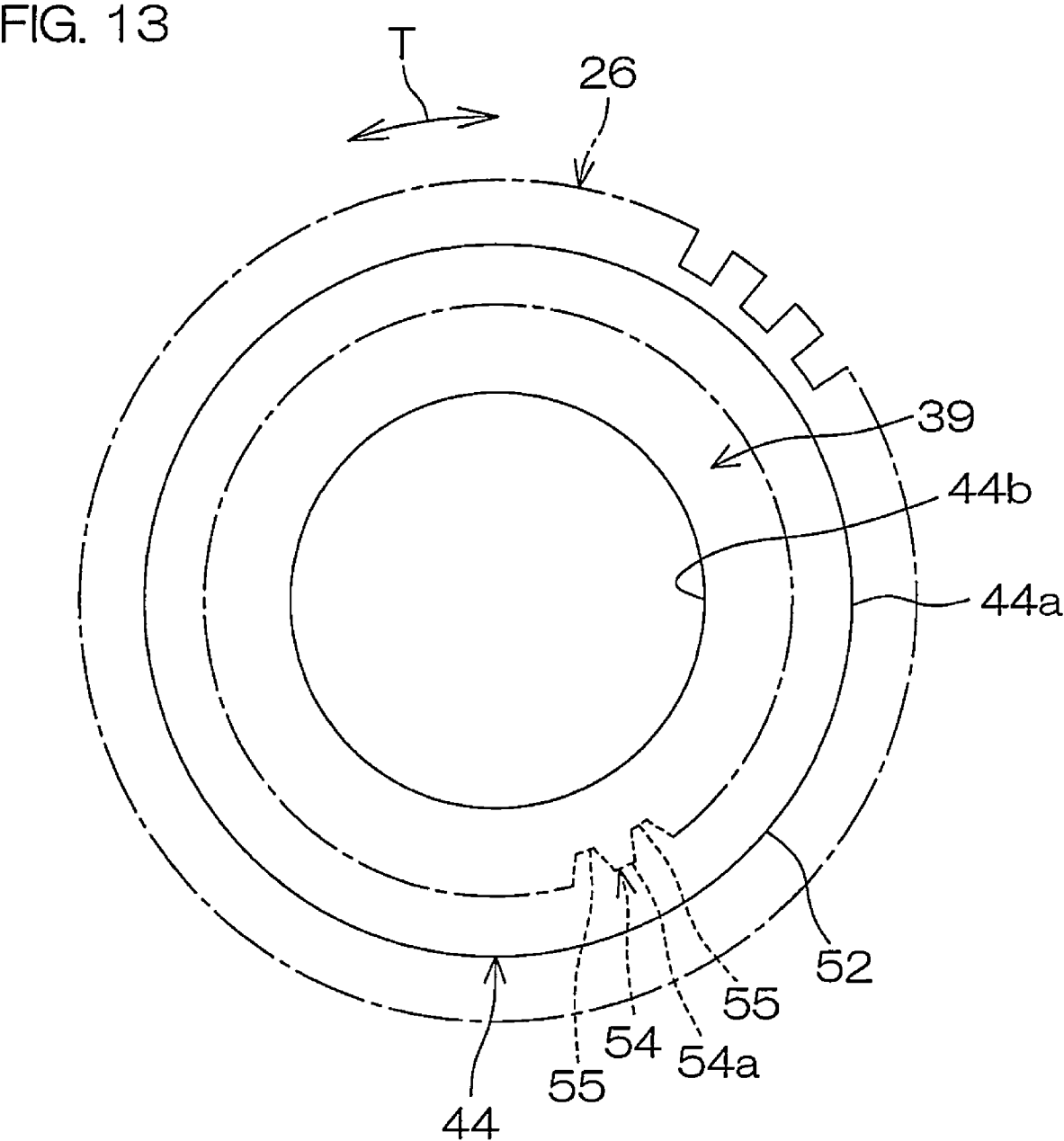
FIG. 13 is a laterally-viewed schematic diagram of an idle gear and a bearing shown in FIG. 12.

FIG. 12 is a cross-sectional view of one portion of the idle gear 26 including a groove 54, being a modified example of the regulating portion, and the outer ring 44. FIG. 13 is a schematic diagram of the idle gear and the bearing in FIG. 12. With reference to FIG. 12 and FIG. 13, as the regulating portion, instead of the projection 53, the single groove 54 (as a swelled portion and also as a concave portion) is formed on the outer peripheral surface 44a of the outer ring 44. The groove 54 extends along the circumferential direction T. In the cross section vertical to the circumferential direction T at an arbitrary circumferential-direction position, the cross-sectional shape of the groove 54 is oblong. The depth of the groove 54 from the cylindrical surface 52 of the outer peripheral surface 44a of the outer ring 44 is constant in the circumferential direction. The groove width (equivalent to the axial direction dimension) of the groove 54 is constant in the circumferential direction.

On a bottom 54a of the groove 54, the plurality of concave portions 55 are formed. The bottom 54a has the plurality of concave portions 55 and the remaining portion other than the plurality of concave portions 55. The plurality of concave portions 55 are indented radially inwardly from the remaining portion of the bottom 54a. In addition, except for these points, the plurality of concave portions 55 of the groove 54 are configured identically to the plurality of concave portions 55 of the projection 53 in the above-described embodiments.

As the regulating portion, the annular groove 54 is arranged. In the groove 54, the concave portion 55 for regulating the relative rotation between the outer ring 44 and the synthetic resin member 43 is formed. Thereby, the relative rotation between the outer ring 44 and the synthetic resin member 43 is reliably regulated. Further, the formation of the annular groove 54 is easy.

Figure 14:
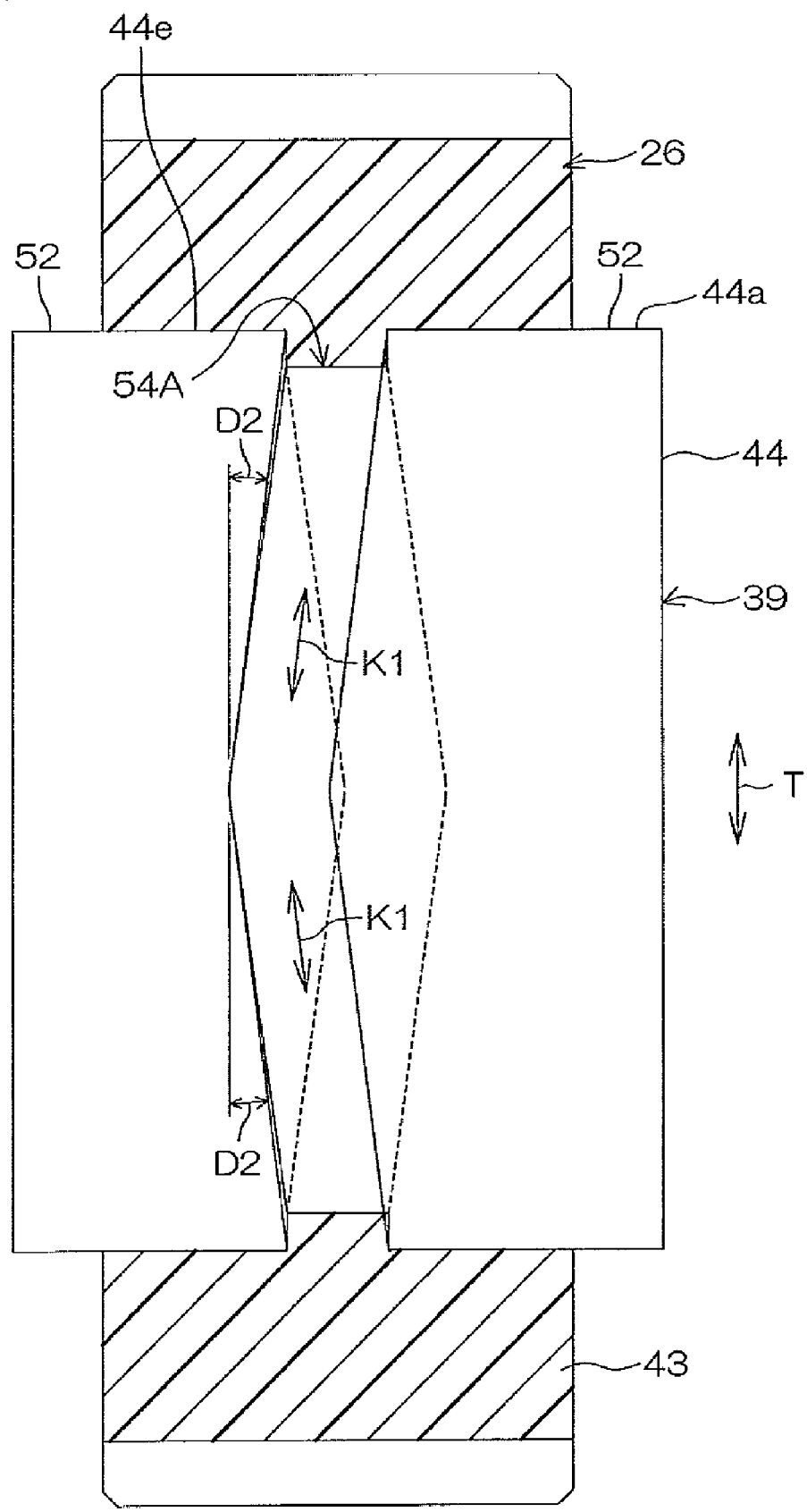
FIG. 14 is a cross-sectional view of one portion of an idle gear including a first modified example of a groove and an outer ring of a bearing.

FIG. 14 is a cross-sectional view of one portion of the idle gear 26 including a groove 54A, being a first modified example of the groove, and the outer ring 44 of the bearing 39. With reference to FIG. 14, the groove 54A is arranged instead of the groove 54, and differs from the groove 54 in the following points: The groove 54A extends along an inclination direction K1 inclined relative to the circumferential direction. The inclination direction K1 forms a predetermined inclination angle D2 relative to the circumferential direction T. The inclination angle D2 of the groove 54A is constant (not zero) in the circumferential direction T. The inclination angle D2 changes in opposite directions at two locations that are opposite to each other in the middle with respect to the direction in which the groove 54A extends. The groove 54A is formed endlessly in the circumferential direction T. The concave portion 55 is eliminated. Except for these points, the groove 54A is configured identically to the groove 54.

The groove 54A, being a regulating portion, is inclined relative to the circumferential direction T, and thus, the relative rotation between the outer ring 44 and the synthetic resin member 43 is reliably regulated. Also, the groove 54A is annular, and thus, the formation of the groove 54A is easy.

Figure 15:
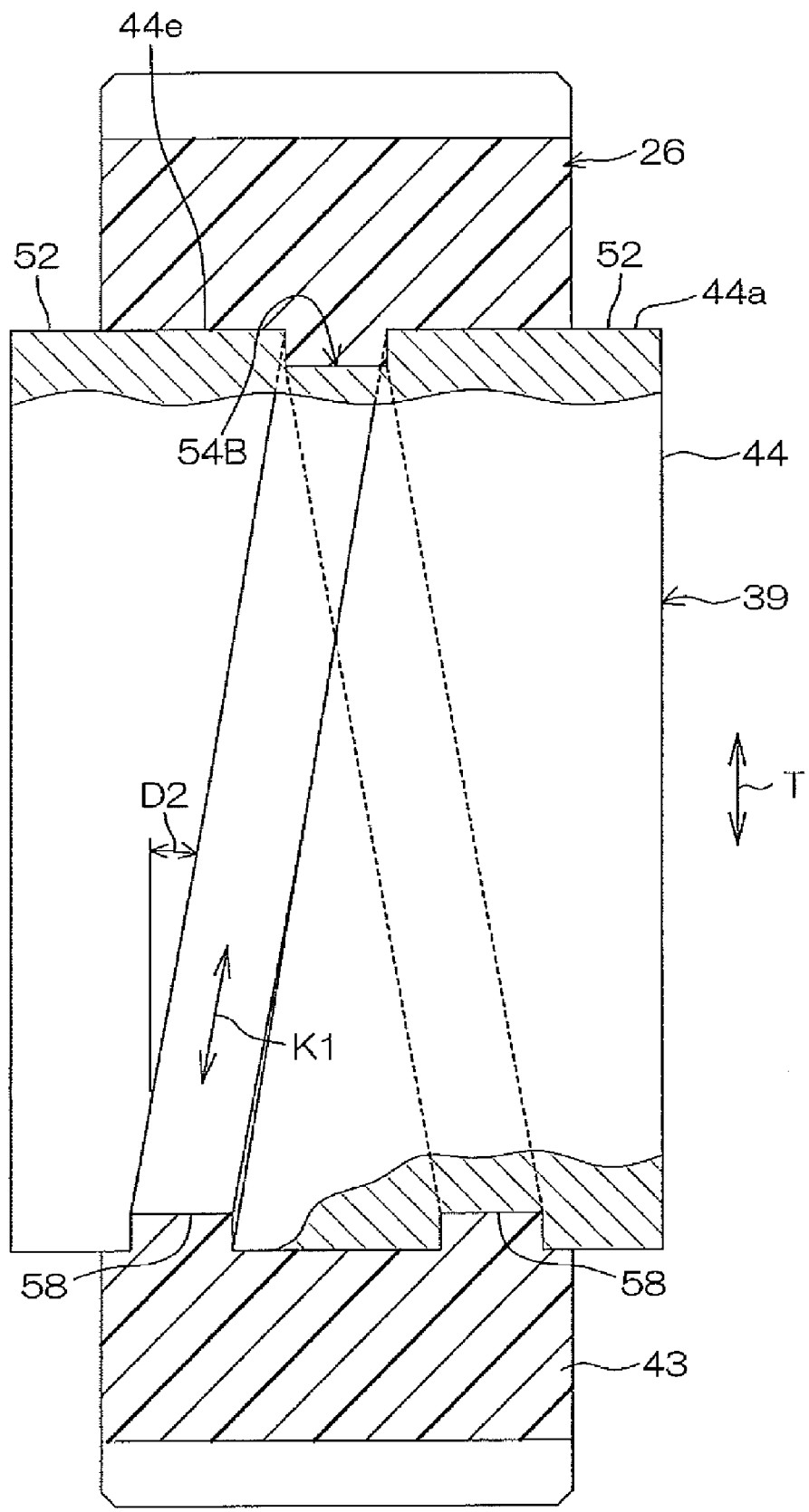
FIG. 15 is a cross-sectional view of one portion of an idle gear including a second modified example of a groove and an outer ring of a bearing.

FIG. 15 is a cross-sectional view of one portion of the idle gear 26 including a groove 54B, being a second modified example of the groove, and the outer ring 44 of the bearing 39.

With reference to FIG. 15, the groove 54B is arranged instead of the groove 54, and differs from the groove 54 in the following points: The groove 54B extends spirally along the inclination direction K1 inclined relative to the circumferential direction T. The inclination direction K1 forms a predetermined inclination angle D2 relative to the circumferential direction T. The inclination angle D2 of the groove 54B is constant (not zero) in the circumferential direction T, and the groove 54B forms to have an end in the circumferential direction T. The concave portion 55 is eliminated. Except for these points, the groove 54B is configured identically to the groove 54.

As a regulating portion, the spiral groove 54B having a pair of ends 58 is arranged. In this case, the relative rotation between the outer ring 44 and the synthetic resin member 43 is reliably regulated.

Figure 16:
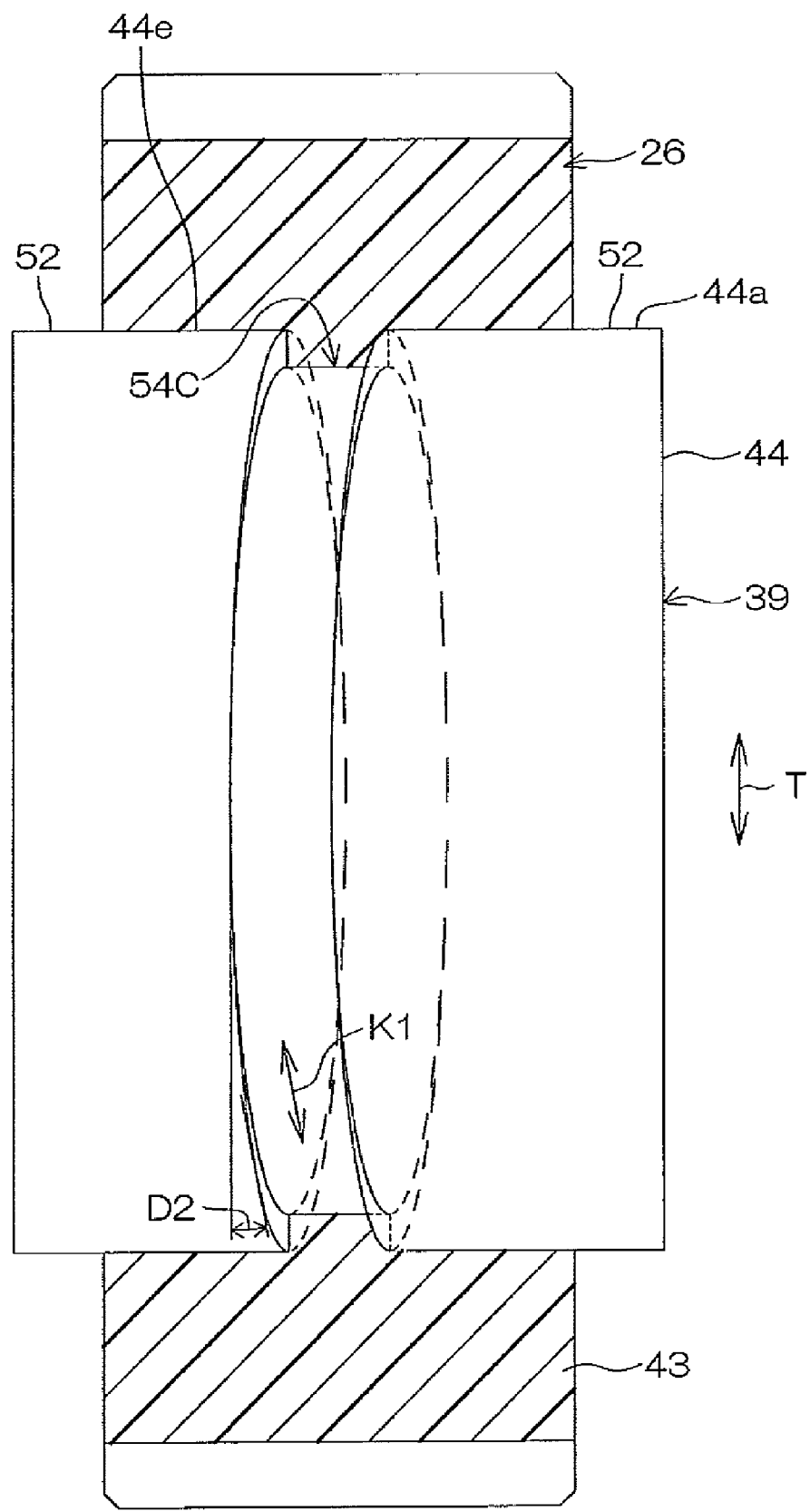
FIG. 16 is a cross-sectional view of one portion of an idle gear including a third modified example of a groove and an outer ring of a bearing.

FIG. 16 is a cross-sectional view of one portion of the idle gear 26 including a groove 54C, being a third modified example of the groove, and the outer ring 44 of the bearing 39. With reference to FIG. 16, the groove 54C is arranged instead of the groove 54, and differs from the groove 54 in the following points: The groove 54C is in an endless ring shape, and is in a generally elliptical shape, for example.

The groove 54C extends along a line of intersection between a plane inclined by a predetermined angle relative to the axial direction of the outer ring 44 and the cylindrical surface of the outer periphery of the outer ring. A radially outward portion of the groove 54C contacts the cylindrical surface 52 of the outer peripheral surface 44a of the outer ring 44. The above-described elliptical shape is similar (in shape) to a cut shape of the cylindrical surface 52 in a cut plane inclined obliquely relative to the center axial line of the cylindrical surface 52.

The groove 54C extends along an inclination direction K1 inclined relative to the circumferential direction T. The inclination direction K1 forms an inclination angle D2 relative to the circumferential direction T, and the inclination angle D2 of the groove 54C changes in the circumferential direction T and reaches zero at two positions in the circumferential direction T. The concave portion 55 is eliminated. Except for these points, the groove 54C is configured identically to the groove 54.

The groove 54C, being a regulating portion, is inclined relative to the circumferential direction T, and thus, the relative rotation between the outer ring 44 and the synthetic resin member 43 is reliably regulated. Further, the groove 54C is annular, and thus, the formation of the groove 54C is easy.

Figure 17:
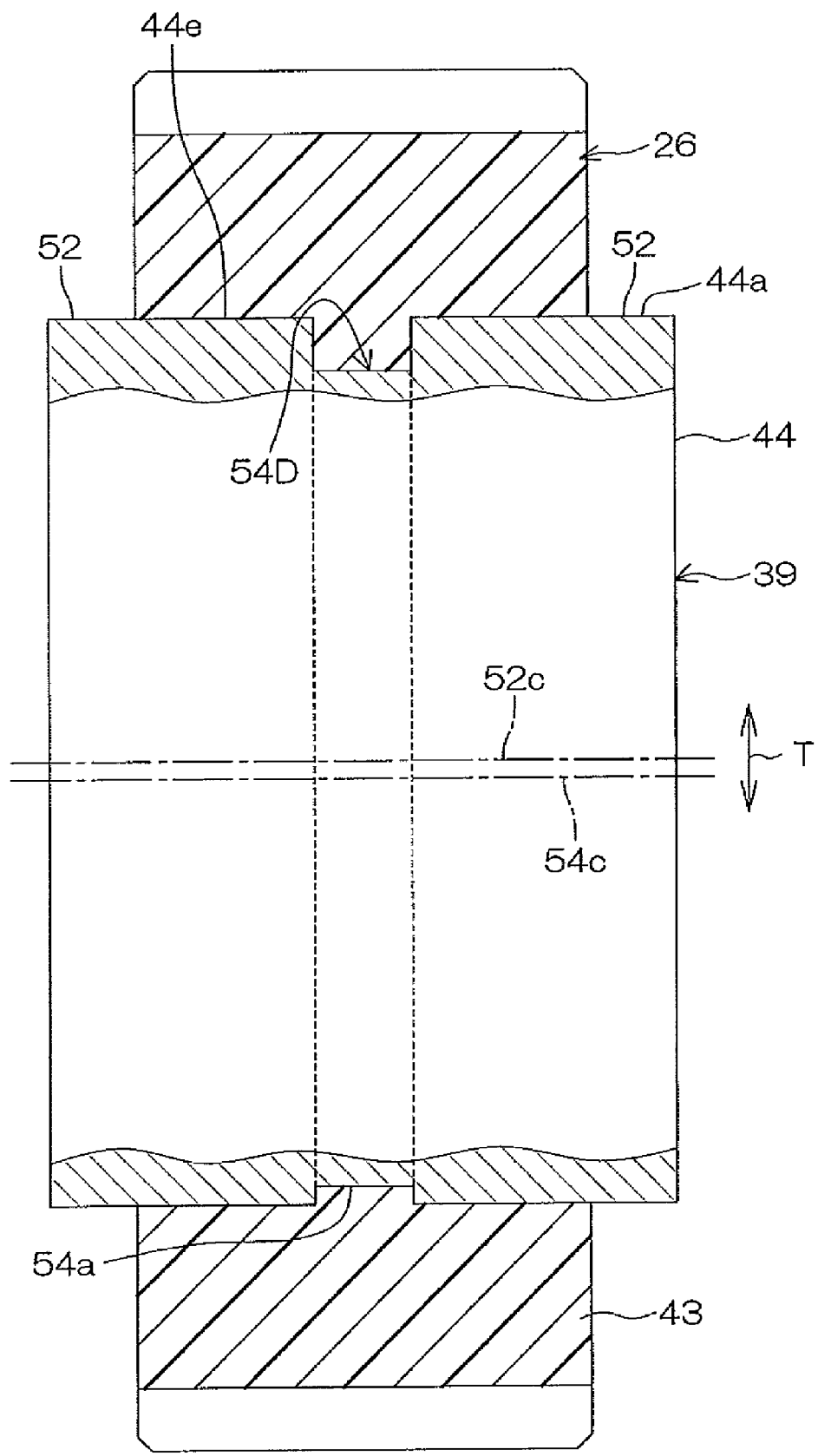
FIG. 17 is a cross-sectional view of one portion of an idle gear including a fourth modified example of a groove and an outer ring of a bearing.
Figure 18:
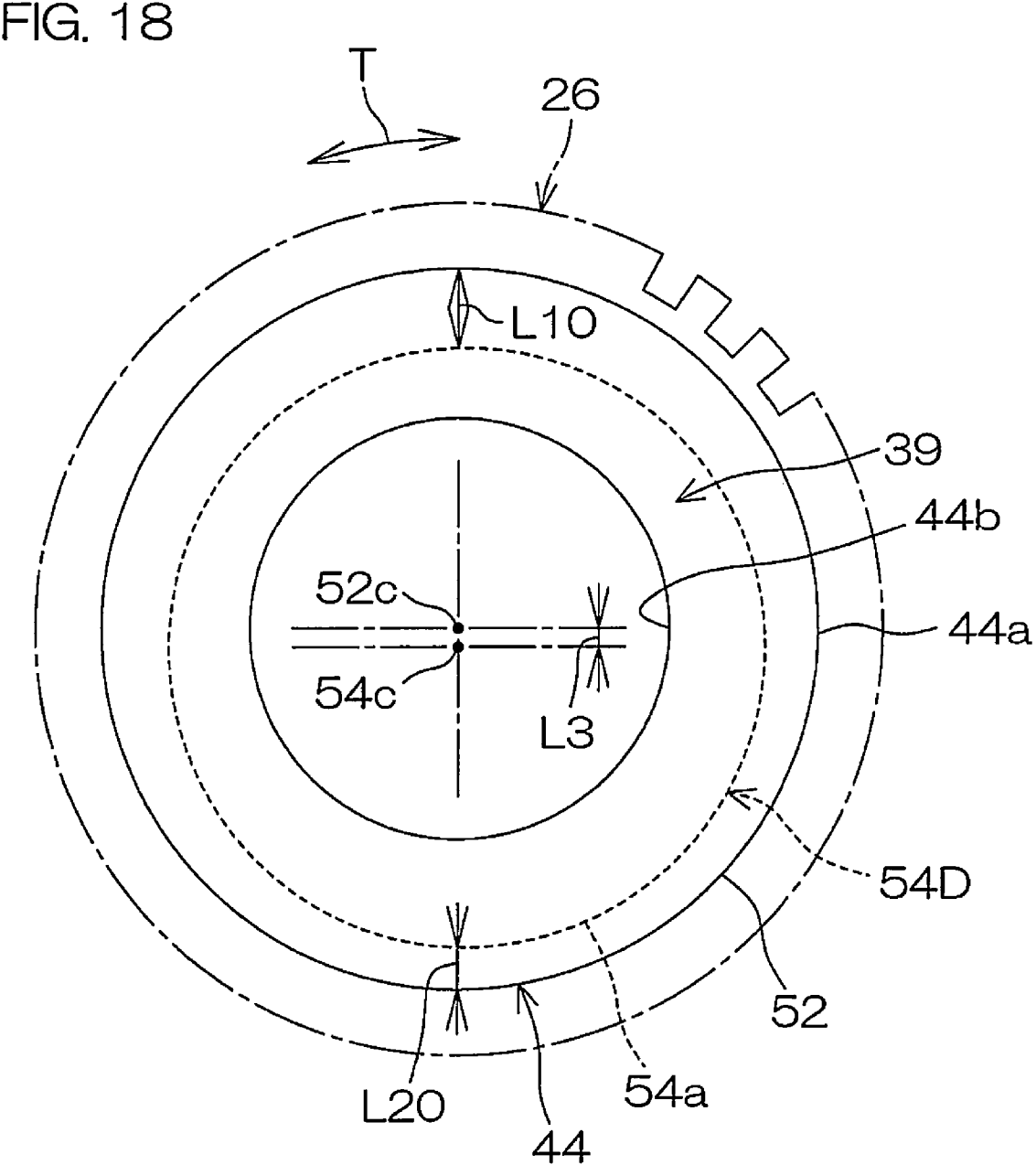
FIG. 18 is a laterally-viewed schematic diagram of the idle gear and the bearing shown in FIG. 17.

FIG. 17 is a cross-sectional view of one portion of the idle gear 26 including a groove 54D, being a fourth modified example of the groove, and the outer ring 44 of the bearing 39. FIG. 18 is a laterally-viewed schematic diagram of the idle gear 26 and the bearing 39 shown in FIG. 17. With reference to FIG. 17 and FIG. 18, the groove 54D is arranged instead of the groove 54, and differs from the groove 54 in the following points: The depth of the groove 54D from the cylindrical surface 52 of the outer peripheral surface 44a of the outer ring 44 differs depending on each position in the circumferential direction T. For example, the groove bottom 54a of the groove 54D forms a cylindrical surface. The center axial line 54c of the groove bottom 54a and the center axial line 52c of the cylindrical surface are placed in parallel to each other and eccentrically to each other. In the cross section orthogonal to the axial direction, the center of the groove bottom 54a (equivalent to the position of the center axial line 54c) and the center of the cylindrical surface 52 (equivalent to the position of the center axial line 52c) are offset by a predetermined distance L3. As a result, the depth of the groove 54D is nonuniform. For example, the depth changes in value within a range between a maximum value L10 to a minimum value L20. The concave portion is eliminated. Except for these points, the groove 54C is configured identically to the groove 54.

The depth of the groove 54D, being a regulating portion, is nonuniform in the circumferential direction T. Thereby, the relative rotation between the outer ring 44 and the synthetic resin member 43 is reliably regulated. The groove 54D is annular, and the bottom 54a thereof is eccentric to the outer peripheral surface 44a. Thus, the depth being nonuniform can be easily realized.

Figure 19:
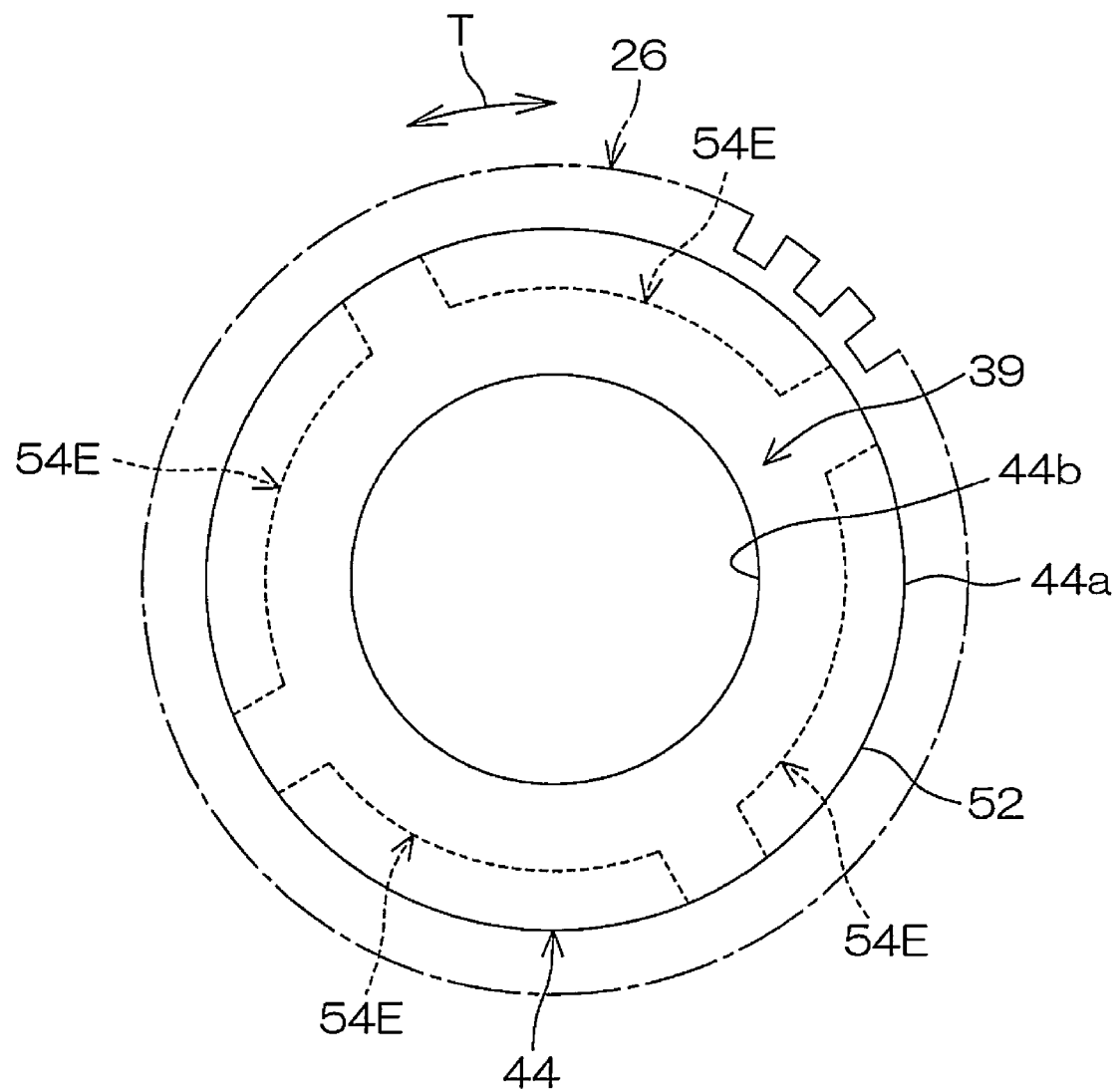
FIG. 19 is a laterally-viewed schematic diagram of an idle gear including a fifth modified example of a groove and a bearing.

FIG. 19 is a laterally-viewed schematic diagram of the idle gear 26 including a plurality of grooves 54E, being a fifth modified example of the groove, and the bearing 39. With reference to FIG. 19, the plurality of grooves 54E are arranged instead of the groove 54, and differ from the groove 54 in the following points: The plurality of grooves 54E have the same shape to one another, and are formed at a plurality of locations to be spaced apart from one another in the circumferential direction T. The two grooves 54E adjacent in the circumferential direction T are spaced apart from each other. The concave portion 55 is eliminated. Except for these points, the grooves 54E are configured identically to the groove 54.

As the regulating portion, a plurality of grooves 54E are arranged. The plurality of grooves 54E are a plurality of concave portions placed with certain intervals in the circumferential direction T of the outer peripheral surface 44a of the outer ring 44. Thereby, the relative rotation between the outer ring 44 and the synthetic resin member 43 is reliably regulated.

Figure 20:
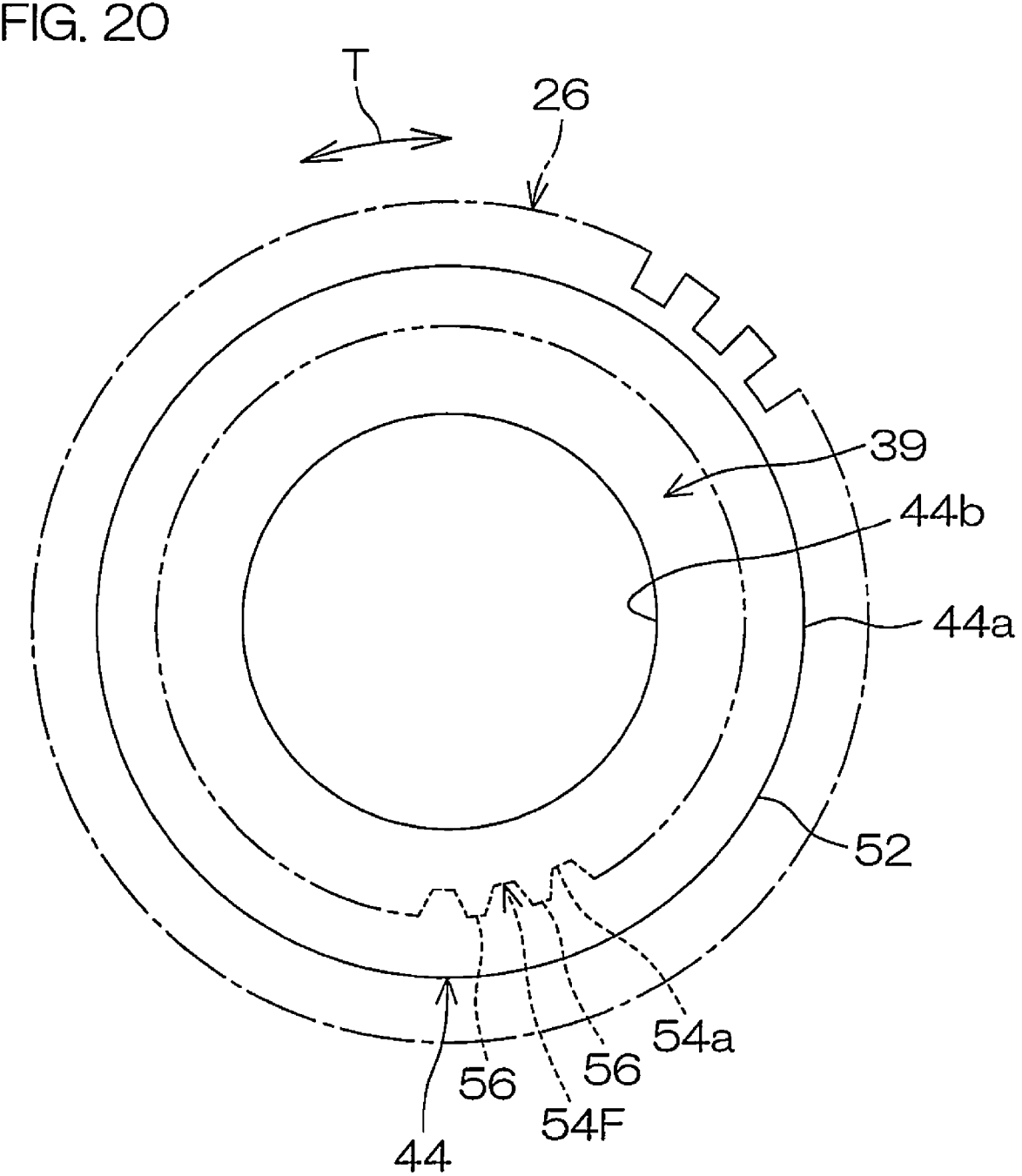
FIG. 20 is a laterally-viewed schematic diagram of an idle gear including a sixth modified example of a groove and a bearing.

FIG. 20 is a laterally-viewed schematic diagram of the idle gear 26 including a groove 54F, being a sixth modified example of the groove, and the bearing 39. With reference to FIG. 20, the groove 54F is arranged instead of the groove 54, and differs from the groove 54 in the following points: The groove 54F is configured identically to the groove 54, but instead of the concave portion 55, the convex portion 56 is formed. The convex portion 56 is placed at the groove bottom 54a of the groove 54F, protruded radially outwardly, and is covered with the synthetic resin member 43. Except for these points, the convex portion 56 is configured identically to the convex portion 56 of the projection 53E, and also, the groove 54F is configured identically to the groove 54.

As the regulating portion, the annular groove 54F is arranged. The groove 54F is formed with the convex portion 56 for regulating the relative rotation between the outer ring 44 and the synthetic resin member 43. Thereby, the relative rotation between the outer ring 44 and the synthetic resin member 43 is reliably regulated. Further, the formation of the annular groove 54F is easy.

Further, the shape of the concave portion 55 of the groove 54 or that of the convex portion 56 of the groove 54E may be a shape of the teeth of the serration or the tooth groove, or a shape of a groove or a projection formed by knurling, similar to the shape of the concave portion 55A or the concave portion 55B.

The feature of the groove 54D, i.e., the depth of the groove bottom 54a being nonuniform in the circumferential direction, may be applied to the grooves 54A, 54B, 54C, 54E, and 54F.

In addition, the concave portion 55 and the convex portion 56 may suffice to be arranged in at least one location. The concave portion 55 and the convex portion 56 may be located at any position where these portions 55 and 56 are covered with the synthetic resin member 43 on the outer peripheral surface 44a of the outer ring 44. It is also conceivable that at least one concave portion 55 or convex portion 56 is arranged in the projections 53A, 53B, 53C, and 53D and the grooves 54A, 54B, 54C, 54D, and 54E.

Further, in the projection 53 and the groove 54, it may also be conceivable to eliminate the concave portion 55. In this case, by the bonding power at the time of the injection molding, the relative rotation between the outer ring 44 and the synthetic resin member 43 is regulated.

The plurality of projections 53 may be placed to be spaced apart in the axial direction. The same applies to the projections 53A, 53B, 53C, 53D, 53E, 53F, and 53G and the grooves 54, 54A, 54B, 54C, 54D, 54E, and 54F.

The cross-sectional shape of the groove 54 in the cross section including the axial direction of the outer ring 44 may be a rectangle or a square and also a triangle, concave-curved, or a trapezoid. Examples of the trapezoidal shape include that of which the width dimension increases as it moves radially inwardly, or contrary thereto, that of which the width dimension decreases as it moves radially inwardly. Each of these shapes may be applied to the grooves 54A, 54B, 54C, 54D, 54E, and 54F.

The feature of the projection 53D and the groove 54E, i.e., the plurality of projections 53D and the grooves 54E being placed to be spaced apart in the circumferential direction, may be applied to the projections 53A, 53B, 53C, and 53E and the grooves 54, 54A, 54B, 54C, 54D, and 54F.

At least one of the projections 53, 53A, 53B, 53C, 53D, and 53E and at least one of the grooves 54, 54A, 54B, 54C, 54D, 54E, and 54F may be arranged on the outer peripheral surface 44a of the single outer ring 44.

Although not shown, the regulating portion may be any one of: a projection, being a convex portion being protruded radially outwardly from the cylindrical surface and extending in the axial direction; a groove, being a concave portion being indented radially inwardly by a predetermined depth from the cylindrical surface and extending in an axial direction; a protrusion, being a convex portion not having a lengthwise direction; a through-hole, being a concave portion not having a lengthwise direction; and an indentation having a predetermined depth. The examples of these will be described.

Figure 21:
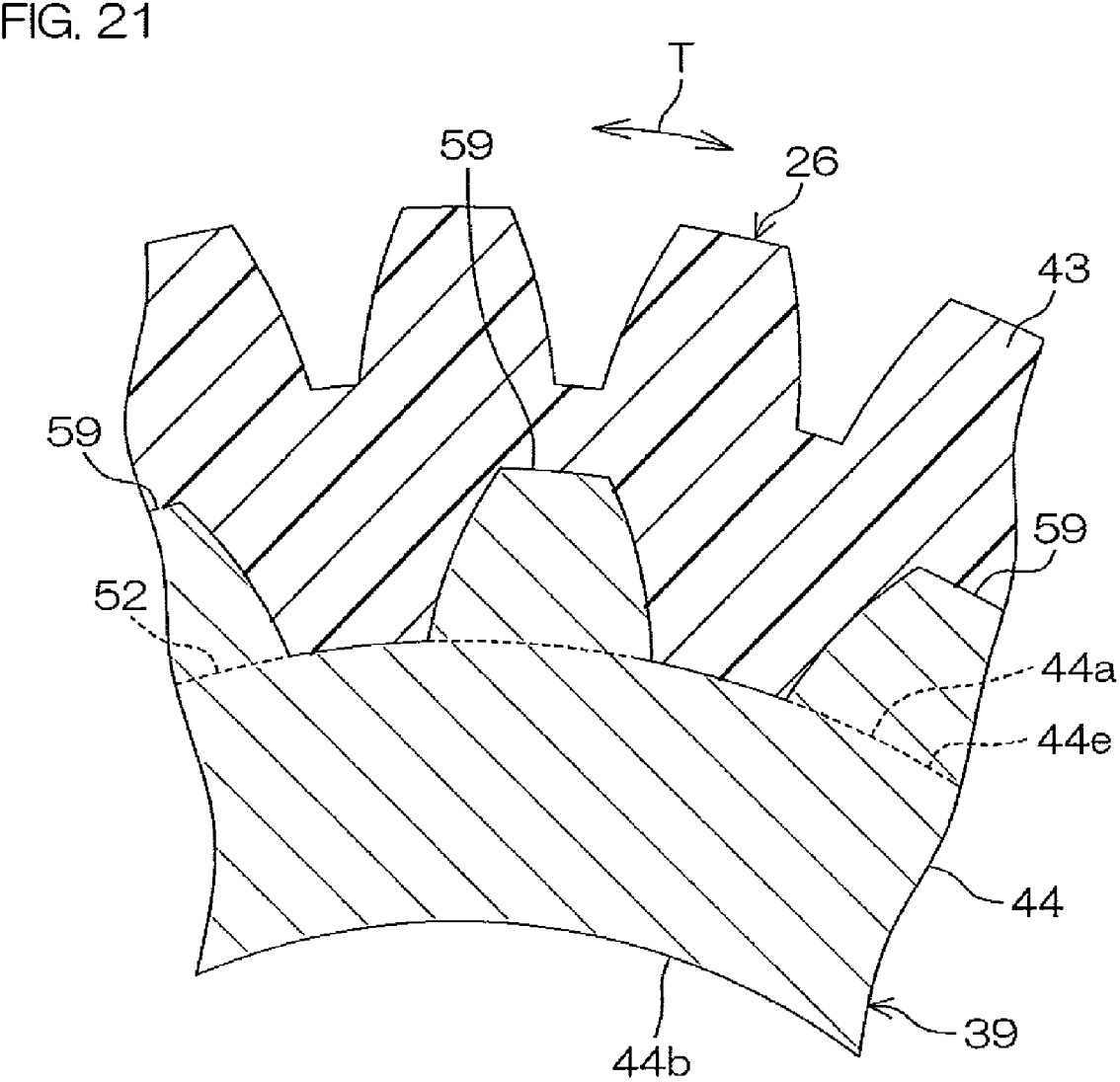
FIG. 21 is a cross-sectional view of an idle gear including a convex portion as a modified example of a regulating portion and a bearing, and shows a cross section vertical to an axial direction.

FIG. 21 is a cross-sectional view of the idle gear 26 including a plurality of convex portions 59, being a modified example of the regulating portion, and the bearing 39, and shows a cross section vertical to the axial direction. The plurality of convex portions 59 are arranged instead of the projection 53. The plurality of convex portions 59 are formed in the intermediate portion 44e of the outer peripheral surface 44a of the outer ring 44 of the bearing 39, and protrude radially outwardly from the cylindrical surface 52 of the outer peripheral surface 44a. The plurality of convex portions 59 are shaped identically to one another, and shaped identically to the convex portion 56, for example, in a shape of teeth of an involute spline. Except for these points, the convex portions 59 are configured identically to the convex portion 56, and function similar thereto.

Figure 22:
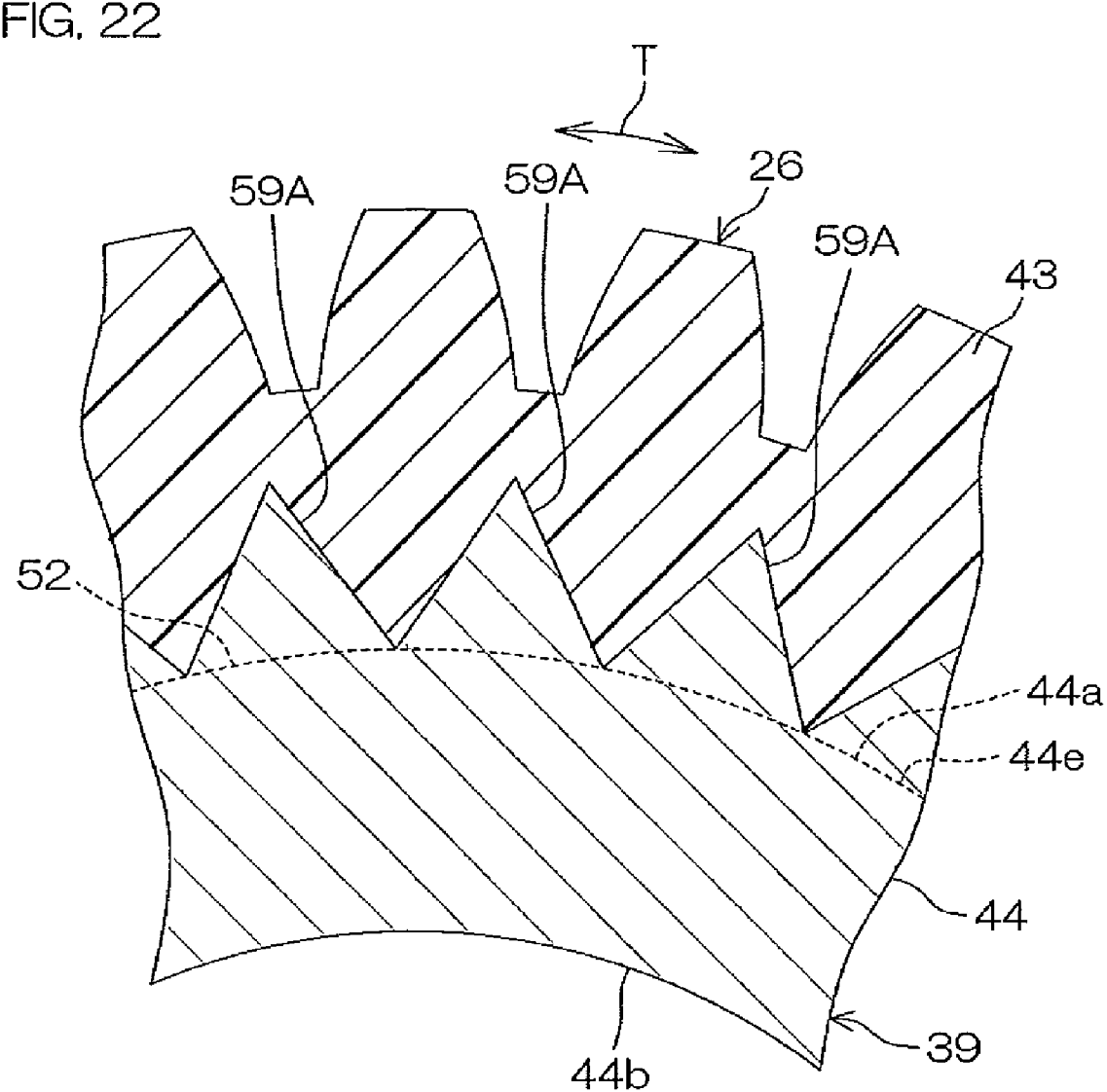
FIG. 22 is a cross section of an idle gear including a first modified example of a convex portion and a bearing, and shows a cross section vertical to an axial direction.

FIG. 22 is a cross-sectional view of the idle gear 26 including a plurality of convex portions 59A, being a first modified example of the convex portion, and the bearing 39, and shows the cross section vertical to the axial direction. The plurality of convex portions 59A are arranged instead of the projection 53. The plurality of convex portions 59A are aligned adjacent to one another along the circumferential direction T. The shape of the convex portion 59A in the cross section crossing vertically to the axial direction is the same as that of the cross section of the teeth of the serration, for example, its shape is triangular. In addition, except for these points, the convex portion 59A is configured identically to the convex portion 59, functions similar to the convex portion 59, and regulates the relative rotation between the outer ring 44 and the synthetic resin member 43.

Figure 23:
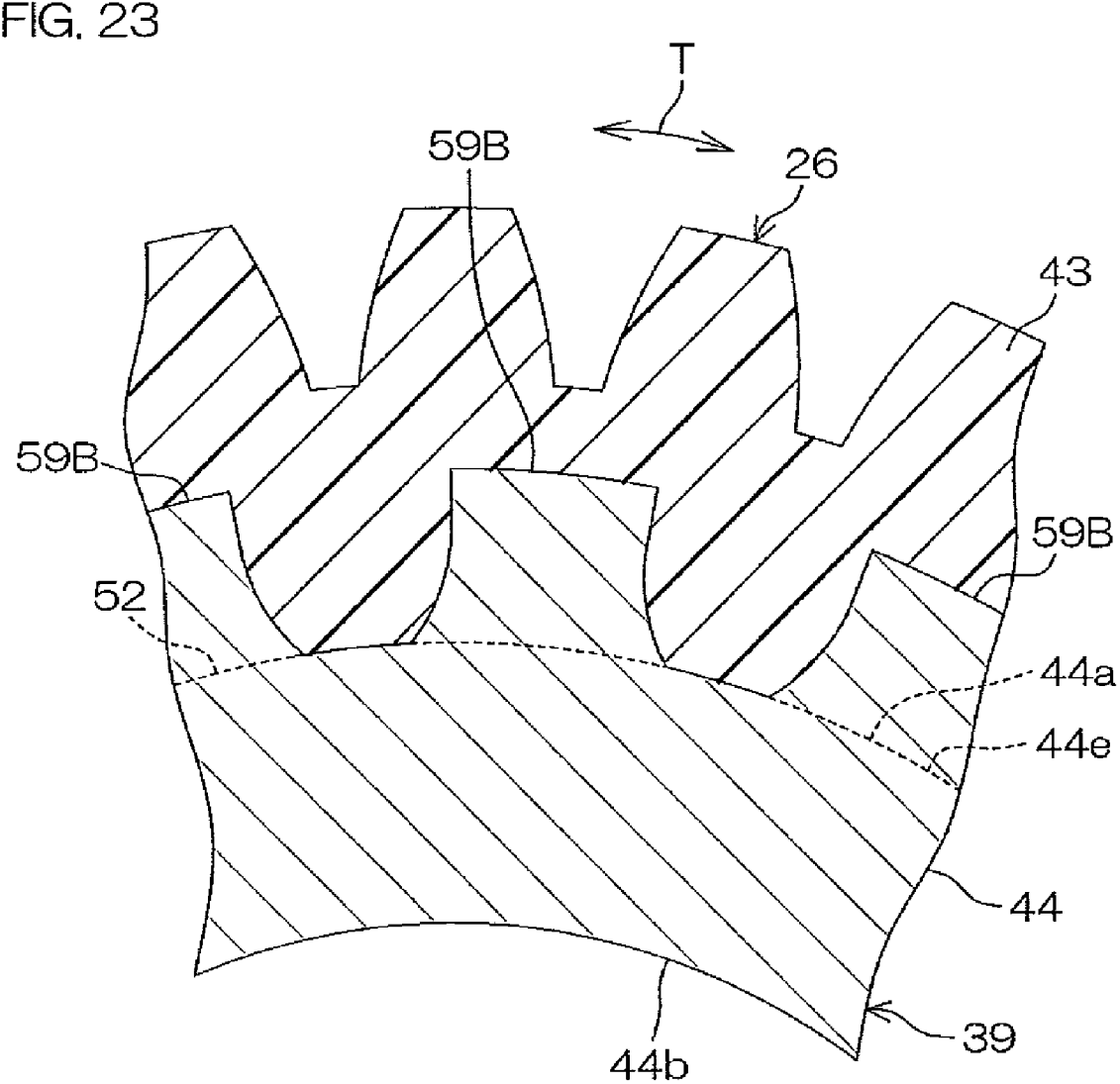
FIG. 23 is a cross section of an idle gear including a second modified example of a convex portion and a bearing, and shows a cross section vertical to an axial direction.

FIG. 23 is a cross-sectional view of the idle gear 26 including a plurality of convex portions 59B, being a second modified example of the convex portion, and the bearing 39, and shows the cross section vertical to the axial direction. The plurality of convex portions 59B are arranged instead of the projection 53. The plurality of convex portions 59A are placed to be spaced apart from one another along the circumferential direction T, are shaped identically to one another, and are shaped in so-called sprocket teeth. The shape of the convex portion 59A in the cross section crossing vertically to the axial direction is oblong or trapezoidal. The width at the root of the convex portion 59A is widened, and also, the convex portion 59A is connected to the outer peripheral surface 44a of the outer ring 44. The convex portion 59B functions similar to the convex portion 59, and regulates the relative rotation between the outer ring 44 and the synthetic resin member 43.

Thus, as the regulating portion, the concave portion or the convex portion formed by knurling may be possible, and a gear-tooth shape may also be possible. The gear teeth may include teeth of an involute spline and those of a serration. Such gear teeth and a swelled portion may be arranged all across the outer peripheral surface 44a, and may be formed on one portion of the outer peripheral surface 44a in at least one of the axial direction and the circumferential direction T. Also, a plurality of regulating portions different in shape to one another may be arranged on the outer peripheral surface 44a. At least one regulating portion may suffice. When the regulating portion includes a projection or a groove, the formation of the regulating portion is easy.

In addition, each of the regulating portions is formed integrally on the outer peripheral surface 44a of the outer ring 44; the regulating portions are not limited thereto. For example, it can also be conceivable that the regulating portion is formed separately of the outer ring 44 and fixed on the outer peripheral surface 44a of the outer ring 44.

The synthetic resin member 43 may cover only one end of the outer peripheral surface 44a in the axial direction, may cover this end and the intermediate portion 44e, or may cover the entire outer peripheral surface 44a. The point is that the synthetic resin member 43 may suffice to cover at least one portion of the outer peripheral surface 44a of the outer ring 44. The synthetic resin member 43 may suffice to cover one or the entire portion of the swelled portion. That is, the synthetic resin member 43 may not cover the cylindrical surface 52, may cover only one portion of the cylindrical surface 52, and may cover the entire cylindrical surface 52. The synthetic resin member 43 may suffice to form at least one portion of the idle gear 26.

As described above, on the outer peripheral surface 44a of the outer ring 44 of the bearing 39, at least one regulating portion described above is arranged, and in a manner to cover this regulating portion, the synthetic resin member 43 is molded. Thereby, the relative rotation between the outer ring 44 and the synthetic resin member 43 is regulated, manufacturing cost is decreased, and the generation of abnormal noise can be suppressed.

The bearing 39 may be a double-row outward angular contact ball bearing or a double-row inward angular contact ball bearing. In the case of these angular bearings, the inner ring 45 of the bearing 39 may be divided in the axial direction. A rolling body may not only be a ball but also be a roller. The outer ring 44 may suffice if it is an annular member formed with an orbit along the inner periphery of which the rolling body rolls.

In each of the embodiments, it is conceivable that: the intermediate shaft 37 and the end plate 38 are formed separately, both are fitted so that they can be positioned coaxially to one another for mutual fixation; mutually separate intermediate shaft 37 and end plate 38 are fitted in a mutually coaxially and relatively rotatable manner. The drive gear 25, the idle gear 26, and the driven gear 27 may be a spur gear.

Thus, the present invention is described in detail by specific modes. Those skilled in the art who understand the above-described contents may easily conceive the modifications, alternations, and equivalents. Therefore, the present invention should cover only the claims and ranges equivalent thereto.

This application corresponds to the following application filed with the Japanese Patent Office, the full disclosure of which is incorporated herein by reference.

Japanese Patent Application No. 2006-292871 (filing date: Oct. 27, 2006)

The invention claimed is:

1. An electric power steering apparatus, comprising a parallel shaft gear mechanism for decelerating an output rotation of an electric motor for a steering assist, wherein
the parallel shaft gear mechanism includes an idle gear rotatably supported via a rolling bearing, on an outer peripheral surface of a spindle supported by a housing,
the idle gear is formed by an annular synthetic resin member fixed on the outer peripheral surface of an outer ring of the rolling bearing,
on the outer peripheral surface of the outer ring, a regulating portion is arranged for regulating relative rotation between the outer ring and the synthetic resin member, and
the synthetic resin member is formed in a manner to cover the regulating portion on the outer peripheral surface of the outer ring, as a result of a molding process using a mold.

2. The electric power steering apparatus according to claim 1, wherein the regulating portion includes a plurality of convex portions or concave portions placed with certain intervals in a circumferential direction of the outer peripheral surface of the outer ring.

3. The electric power steering apparatus according to claim 1, wherein the regulating portion includes a groove or a projection.

4. The electric power steering apparatus according to claim 3, wherein the regulating portion includes an annular groove or an annular projection extending along a direction inclined relative to the circumferential direction of the outer peripheral surface of the outer ring.

5. The electric power steering apparatus according to claim 3, wherein the regulating portion includes either a spiral groove having a pair of ends or a spiral projection having a pair of ends.

6. The electric power steering apparatus according to claim 3, wherein the regulating portion includes an annular groove or an annular projection that is formed with a convex portion or a concave portion for regulating relative rotation between the outer ring and the synthetic resin member and that is extending along a circumferential direction of the outer peripheral surface of the outer ring.

7. The electric power steering apparatus according to claim 3, wherein the regulating portion includes an annular groove extending along a circumferential direction of the outer peripheral surface of the outer ring, and a depth of the annular groove in the circumferential direction is nonuniform.

8. The electric power steering apparatus according to claim 7, wherein a bottom of the annular groove is a cylindrical surface, and the cylindrical surface is eccentric to the outer peripheral surface of the outer ring.

9. The electric power steering apparatus according to claim 3, wherein the regulating portion includes a projection, and a cross-sectional shape of the projection forms a wedge shape of which a width in an axial direction of the outer ring is widened along a radially outward direction of the outer ring.

10. The electric power steering apparatus according to claim 9, wherein the wedge shape is a trapezoidal shape.

11. The electric power steering apparatus according to claim 1, wherein the outer ring includes an inner peripheral surface, and on the inner peripheral surface of the outer ring, a double-row raceway groove is formed.

12. The electric power steering apparatus according to claim 1, wherein the parallel shaft gear mechanism further comprises:
an input shaft placed coaxially to a rotation shaft of the electric motor;
the spindle, being an intermediate shaft, placed in parallel to the input shaft;
an output shaft placed in parallel to the input shaft;
a drive gear arranged in the input shaft; and
a driven gear arranged in the output shaft.

* * * * *